(12) United States Patent
Lee et al.

(10) Patent No.: US 10,581,080 B2
(45) Date of Patent: Mar. 3, 2020

(54) CATHODE AND LITHIUM BATTERY INCLUDING THE SAME

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Yonggun Lee, Suwon-si (KR); Saebom Ryu, Suwon-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 446 days.

(21) Appl. No.: 15/389,815

(22) Filed: Dec. 23, 2016

(65) Prior Publication Data

US 2017/0309917 A1    Oct. 26, 2017

(30) Foreign Application Priority Data

Apr. 20, 2016    (KR) .................. 10-2016-0048167

(51) Int. Cl.
*H01M 4/62*    (2006.01)
*H01M 10/0525*    (2010.01)
(Continued)

(52) U.S. Cl.
CPC ............. *H01M 4/628* (2013.01); *H01M 4/13* (2013.01); *H01M 4/366* (2013.01); *H01M 10/0525* (2013.01); *H01M 2004/028* (2013.01)

(58) Field of Classification Search
CPC ......... H01M 4/628; H01M 4/13; H01M 4/366
See application file for complete search history.

(56) References Cited

U.S. PATENT DOCUMENTS 6,277,514 B1 *  8/2001  Ying ................... H01M 2/16
                                                  429/129
7,473,491 B1 *  1/2009  Amine ................ H01B 1/122
                                                  429/188

(Continued)

FOREIGN PATENT DOCUMENTS

JP    2010102895 A    5/2010
JP    201397871 A     5/2013

(Continued)

OTHER PUBLICATIONS

A. Abouimrane et al., "Liquid electrolyte based on lithium bis-fluorosulfonyl imide salt: Aluminum corrosion studies and lithium ion battery invenstigations", Journal of Power Sources 189 (2009) 693-696.

(Continued)

*Primary Examiner* — Jimmy Vo
(74) *Attorney, Agent, or Firm* — Cantor Colburn LLP

(57) ABSTRACT

A cathode includes a cathode active material layer including a cathode active material; and a coating layer that is disposed on the cathode active material layer and that includes a block copolymer, wherein the block copolymer includes at least one first block that forms a structure domain and a second block that forms an ion conductive domain, and a total amount of the first block is in a range of about 20 weight percent to about 80 weight percent based on the total weight of the block copolymer.

20 Claims, 14 Drawing Sheets

(51) Int. Cl.
  *H01M 4/36* (2006.01)
  *H01M 4/13* (2010.01)
  *H01M 4/02* (2006.01)

(56) References Cited

U.S. PATENT DOCUMENTS

| | | | |
|---|---|---|---|
| 7,682,740 | B2 | 3/2010 | Yong et al. |
| 7,923,149 | B2 | 4/2011 | Hwang et al. |
| 9,088,051 | B2 | 7/2015 | Roh et al. |
| 2006/0035146 | A1* | 2/2006 | Hayashi ............... H01M 4/133 429/217 |
| 2011/0111289 | A1* | 5/2011 | Choi ..................... H01M 4/131 429/207 |
| 2015/0030933 | A1* | 1/2015 | Goetzen ............... H01M 2/1646 429/231.95 |
| 2015/0086837 | A1 | 3/2015 | Laramie et al. |
| 2015/0099167 | A1 | 4/2015 | Oshima et al. |

FOREIGN PATENT DOCUMENTS

| | | |
|---|---|---|
| JP | 5290699 B2 | 6/2013 |
| JP | 201496343 A | 5/2014 |
| JP | 5660112 B2 | 12/2014 |
| KR | 1020060041649 A | 5/2006 |
| KR | 100666821 B1 | 1/2007 |
| KR | 100786850 B1 | 12/2007 |
| KR | 1020110121690 A | 11/2011 |
| KR | 101147239 B1 | 5/2012 |
| KR | 1020120046609 A | 5/2012 |

OTHER PUBLICATIONS

David Yaohui Wang et al., "Effect of Mixtures of Lithium Hexafluorophosphate (LiPF6) and Lithium Bis(fluorosulfonyl)imide (LiFSl) as Salts in Li[Ni1/3Mc1/3]O2/Graphite Pouch Cells", Journal of the Electrochemical Society, 162 (1) A169-A175 (2015).

Enrique D. Gomez et al., "Effect of Ion Distribution on Conductivity of Block Copolymer Electrolytes", Nano Letters, 2009, vol. 9, No. 3, pp. 1212-1216.

Erang Cho et al., "Corrosion/passivation of aluminum current collector in bis(fluorosulfonyl) imide-based ionic liquid for lithium-ion batteries", Electrochemistry Communications 22 (2012) 1-3.

Eun-Ho Lee et al., "Direct surface modification of high-voltage LiCoO2 cathodes by UV-cured nanothickness poly(ethylene glycol diacrylate) gel polymer electrolytes", Electrochimica Acta 104 (2013) 249-254.

Ju-Myung Kim et al., "Multifunctional semi-interpenetrating polymer network-nanoencapsulated cathode materials for high-performance lithium-ion batteries", Scientific Reports, (2014) pp. 1-7.

Lan Xia et al., "Thiophene derivatives as novel functional additives for high-voltage LiCoO2 operations in lithium ion batteries", Electrochimica Acta 151 (2015) 429-436.

Yoon Seok Jung et al., "Enhances Stability of LiCoO2 Cathodes in Lithium-Ion Batteries Using Surface Modification by Atomic Layer Deposition", Journal of the Electrochemical Society, 157 (1) A75-A81 (2010).

Zhiguo Wang et al., "Structure and electrochemical performance of LiCoO2 cathode material in different voltage ranges", Ionics (2014) 1525-1534.

* cited by examiner

US 10,581,080 B2

CATHODE AND LITHIUM BATTERY INCLUDING THE SAME

CROSS-REFERENCE TO RELATED APPLICATION

This application claims the benefit of and priority to Korean Patent Application No. 10-2016-0048167, filed on Apr. 20, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode and a lithium battery including the cathode.

2. Description of the Related Art

Towards manufacturing high-performance electronic devices, a lithium battery with a high energy density, yet that is small and light weight, is desirable. That is, a lithium battery capable of operating at a high voltage (ca. 4.0 V) and with a high capacity has become important.

A conventional cathode may be susceptible side reactions with an electrolyte solution during multiple charging/discharging cycles, and a cathode active material in the cathode may also produce by-products such as transition metals and volatile gases. Furthermore, the generation of the side reactions and by-products is increased at a high voltage.

Therefore, a cathode and a lithium battery that are stable at a high voltage by suppressing generation of the side reactions and by-products at a high voltage are needed.

SUMMARY

Provided is a cathode that is stable at a high voltage (ca. about 4.0 V or greater).

Provided is a lithium battery including the cathode.

Additional aspects will be set forth in part in the description which follows and, in part, will be apparent from the description, or may be learned by practice of the presented embodiments.

According to an aspect of an embodiment, a cathode includes a cathode active material layer including a cathode active material; and a coating layer disposed on the cathode active material layer and including a block copolymer, wherein the block copolymer includes at least one first block that constitutes a structure domain and at least one second block that constitutes an ion conductive domain, and a total amount of the at least one first block is in a range of about 20 weight percent to about 80 weight percent based on a total weight of the block copolymer.

According to an aspect of another embodiment, a lithium battery includes the cathode including the coating layer; an anode; and an electrolyte disposed between the cathode and the anode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
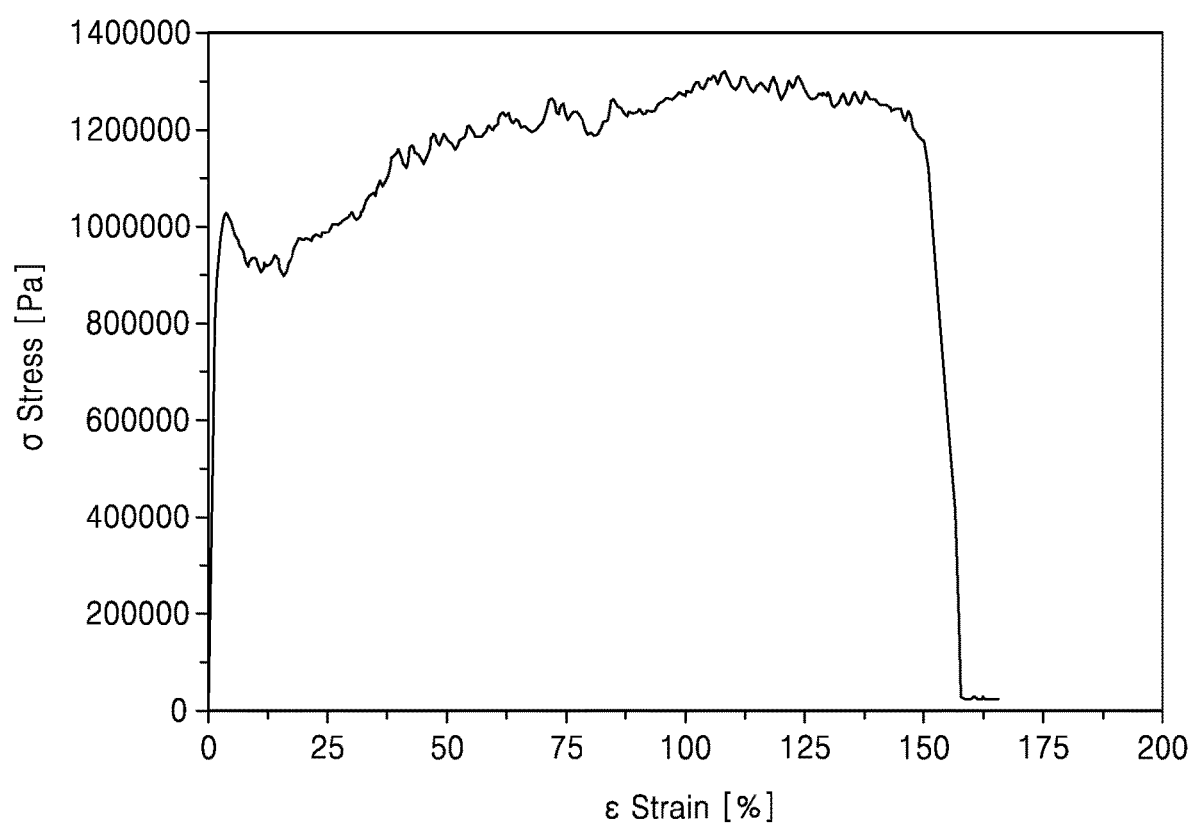
FIG. 1 is a graph of stress (σ; Pascals, Pa) versus strain (ε, %) and shows a stress-strain diagram of a block copolymer layer prepared in Preparation Example 1.

Reference will now be made in detail to embodiments of a cathode and a lithium battery including the same, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "disposed on" refers to elements which are directly disposed by direct contact with each other and indirectly disposed by including the presence of another region, feature, element, and/or component.

As used herein, the term "a combination thereof" denotes a combination including at least one element selected from a list of recited elements.

As used herein, the term "structure domain" refers to a region of a block copolymer that contributes to the mechanical strength of the block copolymer.

As used herein, the term "ion conductive domain" refers to a region of the block copolymer that contributes to the ion conductivity of the block copolymer.

As used herein, the term "alkyl" includes straight-chain, branched, or cyclic groups.

Provided is a cathode that includes a cathode active material layer; and a coating layer that contains a block copolymer. The coating layer is disposed on the cathode active material layer. The block copolymer includes at least one first block that constitutes a structure domain and at least one second block that constitutes an ion conductive domain, and a total amount of the first block is in a range of about 20 weight percent (wt %) to about 80 wt % based on the total weight of the block copolymer.

When the amount of the first block is within this range, the coating layer may provide improved strength and a suitable anion conduction path at the same time, which may effectively suppress side reactions between the cathode and an electrolyte even at a high voltage (ca. about 4.0 V), and thus the lithium battery may have enhanced stability at high voltage. When the amount of the first block is greater than this range, an insulating property of the coating layer increases, which makes it difficult to secure a suitable ion conduction path. When the amount of the first block is lower than this range, the strength of the coating layer deteriorates, and thus the coating layer may swell due to a liquid electrolyte, which may increase side reactions between the electrolyte solution and the cathode active material on a surface of the cathode.

A tensile modulus of the coating layer including the block copolymer having an amount of the first block within this range above may be about $1 \times 10^6$ Pascals (Pa) or greater at 25° C. For example, a tensile modulus of the coating layer may be about $10 \times 10^6$ Pa or greater at 25° C. For example, a tensile modulus of the coating layer including the block copolymer may be about $100 \times 10^6$ Pa or greater at 25° C. Since the coating layer including the block copolymer provides a high tensile modulus of about $1 \times 10^6$ Pa or greater, the mechanical strength of the coating layer may be maintained.

An elongation at break of the coating layer may be about 100% or greater at 25° C. For example, an elongation at break of the coating layer including the block copolymer may be about 130% or greater at 25° C. For example, an elongation at break of the coating layer including the block copolymer may be about 150% or greater at 25° C. When the coating layer including the block copolymer provides an elongation at break of about 100% or greater, a firm layer that resists cracking may be formed. The tensile modulus and elongation at break of the coating layer including the block copolymer may be measured by preparing a sample in the form of a layer having the same composition as the coating layer.

A thickness of the coating layer including the block copolymer having an amount of the first block within this range above may be about 1 micrometer (μm) or less. For example, a thickness of the coating layer may be in a range of about 10 nanometers (nm) to about 1 μm. For example, a thickness of the coating layer may be in a range of about 10 nm to about 900 nm. For example, a thickness of the coating layer may be in a range of about 50 nm to about 800 nm. For example, a thickness of the coating layer may be in a range of about 50 nm to about 600 nm. For example, a thickness of the coating layer may be in a range of about 50 nm to about 500 nm. For example, a thickness of the coating layer may be in a range of about 50 nm to about 300 nm. For example, a thickness of the coating layer may be in a range of about 50 nm to about 200 nm. When the thickness of the coating layer is within these ranges, improved strength and a suitable ion conduction path may be provided. When the thickness of the coating layer is greater than these ranges, a length of the ion conduction path that passes through the coating layer increases, and thus an interfacial resistance increases, which then may result in deterioration of battery performance.

The coating layer including the block copolymer having an amount of the first block within this range above may be stable with respect to an organic solvent and a liquid electrolyte including the organic solvent. The organic solvent may be an ether solvent, a carbonate solvent, or a combination thereof. Examples of the organic solvent may include a carbonate compound, a glyme compound, a dioxolane compound, dimethyl ether, 1,1,2,2-tetrafluoroethyl-2,2,3,3-fluoropropyl ether, or a combination thereof. Since the coating layer is stable with respect to the organic solvent and the liquid electrolyte including the organic solvent, the strength of the coating layer does not substantially deteriorate and the coating layer may not dissolved in the organic solvent and the liquid electrolyte even when the coating layer contacts the organic solvent and the liquid electrolyte for an extended period of time.

A solubility parameter difference (Δδ) between the block copolymer having an amount of the first block within the range above and a solvent including an ether solvent, a carbonate solvent, or a combination thereof, may be about 3 or greater. When the solubility parameter difference between the block copolymer having an amount of the first block within the range above and a solvent selected from an ether solvent and a carbonate solvent is about 3 or greater, the coating layer including the block copolymer is stable with respect to the organic solvent and the liquid electrolyte.

A conventional coating layer uses a gel-type electrolyte which includes a polymer and a liquid electrolyte. However, a polymer for forming a gel-type electrolyte has poor mechanical properties.

When the gel-type electrolyte is prepared by using a polymer having undesirable mechanical properties, nano-sized inorganic particles may be further included in the electrolyte. When the nano-sized inorganic particles are included, the mechanical properties of the electrolyte may improve but an interfacial resistance of the electrolyte may increase.

Also, when a layer including a block copolymer containing a polyethylene oxide is used as a coating layer, the coating layer may dissolve in an electrolyte that contains an ether solvent and/or a carbonate solvent.

However, the cathode according to an embodiment may use the coating layer including the block copolymer having an amount of the first block within the range above may have desirable mechanical properties including strength, ductility, and elasticity, preferably at the same time, and may have excellent stability with respect to a liquid electrolyte that includes an ether organic solvent and/or a carbonate organic solvent.

A molecular weight of each of at least one first block and at least one second block included in the block copolymer having an amount of the first block within the range above may be 5,000 Dalton (Da) or greater. For example, a molecular weight of each of the first block and the second block may be in a range of about 5,000 to about 150,000 Da. For example, a molecular weight of each of at least one first block and at least one second block may be in a range of about 10,000 to about 100,000 Da. For example, a molecular weight of each of the first block and the second block may be in a range of about 25,000 to about 75,000 Da. When the molecular weight of the first block and the second block are within these ranges, the coating layer may provide improved strength and a suitable ion conduction path.

A plurality of block copolymers may be arranged to form a structural domain including a plurality of first blocks and an ionically conductive domain including a plurality of second blocks. The structural domain provides the mechanical properties to a block copolymer arrangement. The structural domain may be relatively electrically and ionically non-conductive compared to the ion conductive domain. The ion conductive domain, together with a lithium salt, provides an ion conduction path to the block copolymer arrangement. The second block included in the ion conductive domain may include an ion conductive block, a rubbery block, and a nitrile group-containing block. The ion conductive block, rubbery block, and nitrile group-containing block alone or as a combination, e.g., a mixture with a lithium salt may form the ion conductive domain and thus may provide the ion conduction path. The first blocks and the second blocks of the block copolymer are described below.

The block copolymer arrangement may form domains having various shapes according to the types of first blocks and second blocks that constitute the block copolymer, and a nanostructured block copolymer material may be formed.

The first block includes a plurality of first repeating units. The first repeating units constitute a first block that may affect the mechanical properties of the block copolymer, and the first repeating units may be derived from styrene, 4-bromostyrene, tert-butylstyrene, divinylbenzene, a (C1-C8 alkyl) methacrylate such as methyl methacrylate, isobutyl methacrylate, or cyclohexyl methacrylate, ethylene, propylene, a reactive dimethylsiloxane oligomer, isobutylene, N-isopropylacrylamide, vinylidene fluoride, acrylonitrile, 4-methylpentene-1, butylene terephthalate, ethylene terephthalate, vinyl pyridine, methacrylic acid, maleic acid, maleic anhydride, cyclohexyl vinylether, tert-butyl vinylether, or a combination thereof. Other monomers may be used, for example monomers capable of forming polyimides and polyamides.

A polymer including the first repeating units may include a polystyrene, a hydrogenated polystyrene, a poly(C1 to C8 alkyl) methacrylate, a poly(methyl methacrylate), a polyvinyl pyridine, a polyvinyl cyclohexane, a polyimide, a polyamide, a polyethylene, a polybutylene, a polypropylene, a poly(4-methylpentene-1), a poly(butylene terephthalate), a poly(isobutyl methacrylate), a poly(ethylene terephthalate), a polydimethyl siloxane, a polyacrylonitrile, a polyvinyl cyclohexane, a polymaleic acid, a polymaleic anhydride, a polyamide, a polymethacrylic acid, a poly(tert-butyl vinylether), a poly(cyclohexyl methacrylate), a poly(cyclohexyl vinylether), a polyvinylidene fluoride, a polydivinylbenzene, a copolymer that includes at least two repeating units that constitute the polymer described above, or a combination thereof.

For example, the first block may be a polystyrene block.

The second block includes a plurality of second repeating units. For example, the second repeating unit may be derived from a monomer including acrylonitrile, isoprene, butadiene, chloroprene, isobutylene, ethylene oxide, a reactive siloxane, urethane-forming monomers, or a combination thereof.

A polymer including the second repeating unit may include a polyacrylonitrile, a polyisoprene, a polybutadiene, a polychloroprene, a polyisobutylene, a polyethylene oxide, a polydimethylsiloxane, a polyurethane, or a combination thereof.

In the block copolymer, the first block and the second block may be linked by a covalent bond. The block copolymer satisfying the description above may be a linear block copolymer. In the linear block copolymer, a terminal end of at least one first block is covalently bonded with a terminal end of at least one second block, and thus a main polymer chain is linear.

The block copolymer including at least one first block and at least one second block may be a diblock copolymer, a triblock copolymer, or a tetrablock copolymer. The block copolymer may be a linear block copolymer. A plurality of linear block copolymers may be arranged to form a firm, for example a rigid nanostructure block copolymer material.

An amount of the first block in the diblock copolymer may be in a range of about 20 wt % to about 70 wt % based on the total weight of the diblock copolymer. For example, an amount of the first block in the diblock copolymer may be in a range of about 30 wt % to about 70 wt % based on the total weight of the diblock copolymer. For example, an amount of the first block in the diblock copolymer may be in a range of about 40 wt % to about 70 wt % based on the total weight of the diblock copolymer. For example, the diblock copolymer may include a first block (A) and a second block (B).

An amount of the first block in the triblock copolymer may be in a range of about 20 wt % to about 70 wt % based on the total weight of the triblock copolymer. For example, an amount of the first block in the triblock copolymer may be in a range of about 30 wt % to about 70 wt % based on the total weight of the triblock copolymer. For example, an amount of the first block in the triblock copolymer may be in a range of about 40 wt % to about 70 wt % based on the total weight of the triblock copolymer. For example, the triblock copolymer may include a first block (A), a second block (B), and a first block (A) where each (A) is the same type of block, e.g., polystyrene. For example, the triblock copolymer may include a first block (A), a second block (B), and a second block (C) different from second block (B). For example, the triblock copolymer may include a second block (B), a first block (A), and a second block (B).

An amount of the first block in the tetrablock copolymer may be in a range of about 20 wt % to about 70 wt % based on the total weight of the tetrablock copolymer. For example, an amount of the first block in the tetrablock copolymer may be in a range of about 30 wt % to about 70 wt % based on the total weight of the tetrablock copolymer. For example, an amount of the first block in the tetrablock copolymer may be in a range of about 40 wt % to about 70 wt % based on the total weight of the tetrablock copolymer. For example, an amount of the first block in the tetrablock copolymer may be in a range of about 50 wt % to about 70 wt % based on the total weight of the tetrablock copolymer. For example, the tetrablock copolymer may include a first block (A), a second block (B), a second block (C), and a first block (A).

The block copolymer may additionally include a polymer network. For example, a plurality of block copolymers may be arranged to form a structure domain including a plurality of first blocks and an ion conductive domain including a plurality of second blocks, and the polymer network may be disposed in the ion conductive domain including the second blocks. The second blocks of the block copolymer may be penetrated, that is, interwoven within the polymer network. The block copolymer and the polymer network may not be linked by a covalent bond. When the polymer network is cross-linked between a plurality of second blocks in the ion conductive domain, the strength of the ion conductive domain may improve. For example, a polyethylene oxide or a polysiloxane second block may be dissolved in an ether solvent and/or carbonate solvent, and thus the second block may have an undesirable stability. When the polymer network is introduced into the ion conductive domain including a polyethylene oxide or a polysiloxane second block, the stability of the second block with respect to the solvent or an electrolyte including the solvent may improve.

When the block copolymer further includes the polymer network, the ion conductivity, elasticity, mechanical strength, electrolyte stability, and high-voltage stability of the coating layer may improve.

The second block including a plurality of second repeating units which may penetrate within or be interwoven with the polymer network may include a polyethylene oxide, a polysiloxane, a polyacrylonitrile, a polyisoprene, a polybutadiene, a polychloroprene, a polyisobutylene, a polyurethane, or a combination thereof.

The polymer network may be a polymerization product of a plurality of cross-linking monomers or oligomers.

The cross-linking monomer or oligomer is a compound having two or more groups capable of cross-linking, including ethylenically unsaturated groups such as (meth)acrylates. The cross-linking monomer or oligomer may be diethylene glycoldiacrylate (DEGDA), triethylene glycoldiacrylate (TEGDA), polyethylene glycoldiacrylate (PEGDA), ethoxylated trimethylolpropane triacrylate (ETPTA), hexanediol diacrylate, octafluoropentyl acrylate, or a combination thereof, but embodiments are not limited thereto, and any suitable material available as a cross-linking oligomer in the art may be used.

Polymerization of the cross-linking oligomer may be performed by thermal polymerization or ultraviolet (UV)

light polymerization, but embodiments are not limited thereto, and any suitable method in the art for forming a polymer network by polymerizing a cross-linking oligomer may be used.

The cathode active material layer may further include a polymerization product of the cross-linking oligomer, i.e., a polymer network. The polymer network may be included where the coating layer is not included and/or in addition to the coating layer on a surface of the cathode active material layer. When the polymer network is additionally disposed in the cathode active material layer, physical properties of the cathode may further improve.

Since a role-pressed cathode active material layer has a high mixture density and a relatively bulky block copolymer, the block copolymer may not penetrate into the cathode active material layer even when the cathode active material layer is coated with a coating solution including the block copolymer. Thus, the block copolymer may not be present within the cathode active material layer. For example, the block copolymer may have a concentration gradient that gradually, but usually dramatically decreases in a direction from a surface of the cathode active material layer in contact with an electrolyte to another surface of the cathode active material layer in contact with a current collector.

On the other hand, since the cross-linking monomer or oligomer has a low molecular weight and is relatively small in size, the cross-linking oligomer may more easily penetrate into the cathode active material layer, and thus a polymerization product of the thermal or UV-light polymerized cross-linking oligomer, i.e., a polymer network, may be disposed both on a surface of and inside the cathode active material layer.

For example, the block copolymer may be a block copolymer including a polystyrene first block and a polyacrylonitrile second block; a block copolymer including a polymethylmethacrylate first block and a polyacrylonitrile second block; a block copolymer including a polystyrene first block, a polyacrylonitrile second block, and a polybutadiene second block; a block copolymer including a polystyrene first block, a polyisoprene second block, and a polystyrene first block; a block copolymer including a polystyrene first block and a polybutadiene second block; a block copolymer including a polystyrene first block, a polybutadiene second block, and a polystyrene first block; a block copolymer including a polystyrene first block, a polyethylene oxide second block, a polybutadiene second block, a polystyrene first block, and a polymer network; a block copolymer including a polystyrene first block, a polyethylene oxide second block, and a polymer network; a block copolymer including a polystyrene first block, a polyethylene oxide second block, a polystyrene first block, and a polymer network; a block copolymer including a polystyrene first block, a polysiloxane second block, and a polymer network; and a block copolymer including a polystyrene first bloc, a polysiloxane second block, a polystyrene first block, and a polymer network, or a combination thereof.

The coating layer may include a salt including LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$F)$_2$, LiN(SO$_2$C$_2$F$_5$)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$, or a combination thereof. When the coating layer includes a salt, a suitable ion conduction path may be secured. An amount of the salt included in the coating layer may be in a range of, but not limited to, about 0.1 wt % to about 50 wt % based on the total weight of the block copolymer and the lithium salt. Other salts may include, for example, NaSCN, NaSO$_3$CF$_3$, KTFSI, NaTFSI, Ba(TFSI)$_2$, Pb(TFSI)$_2$, and Ca(TFSI)$_2$.

The coating layer may be nonporous. Without being bound by theory, when the coating layer is nonporous, side reactions between a surface of the cathode active material layer and an electrolyte may be effectively blocked. The term "nonporous" used herein means that pores are not intentionally introduced to the coating layer.

A part of or the whole of the surface of the cathode active material layer may be coated with the coating layer. For example, when the coating layer completely covers the surface of the cathode active material layer, contact between the cathode active material layer and an electrolyte may be substantially, preferably completely, blocked so that the cathode active material layer may be effectively protected. The coating layer may be a protection layer. Therefore, the cathode may be a protected cathode.

In the cathode, an amount of the cathode active material included in the cathode active material layer may be about 90 parts by weight or greater based on 100 parts by weight of the total weight of the cathode active material layer. For example, an amount of the cathode active material may be in a range of about 92 parts to about 99 parts by weight based on 100 parts by weight of the cathode active material layer. For example, an amount of the cathode active material may be in a range of about 95 parts to about 99 parts by weight based on 100 parts by weight of the cathode active material layer. For example, an amount of the cathode active material may be in a range of about 97 parts to about 99 parts by weight based on 100 parts by weight of the cathode active material layer. When the amount of the cathode active material is 90 parts by weight or greater in the cathode active material layer, an energy density of the cathode may improve.

For a conventional polymer electrolyte cathode that is prepared by mixing a cathode active material and a polymer electrolyte, when an amount of the cathode active material is greater than about 80 parts by weight based on 100 parts by weight of the total weight of the cathode active material layer, ion conductivity of the cathode active material layer may be poor, which may result in deterioration of battery performance.

In the cathode, the coating layer may be selectively disposed on a surface of the cathode active material layer. Thus, the coating layer may be disposed on a surface of a cathode active material, a conducting material, and a binder that are exposed on the surface of the cathode active material layer.

When a cathode active material layer is prepared by coating cathode active material particles with the coating layer, mixing, and rolling the coated cathode active material, a mixture density of the cathode may decrease due to the presence of the coating layer on a surface of the cathode active material particle. As a result, an energy density of the cathode may decrease.

According to another embodiment, a lithium battery includes a cathode having a coating layer disposed on the cathode active material layer; an anode; and an electrolyte disposed between the cathode and the anode. The cathode is as described above.

When the cathode having the coating layer disposed on the cathode active material layer is used, high-voltage stability, electrolyte stability, and/or lifespan characteristics of the lithium battery may improve.

The electrolyte disposed between the cathode and the anode may be a liquid electrolyte, but embodiments are not limited to a liquid electrolyte. Examples of the electrolyte may include a solid electrolyte and a gel electrolyte as well as a liquid electrolyte.

The anode includes an anode active material layer, and a coating layer that contains a block copolymer may be additionally disposed on a surface of the anode active material layer. A block copolymer included in the coating layer disposed on the surface of the anode active material layer includes at least one first block that forms a structure domain and at least one second block that forms an ion conductive domain, and an amount of the first block may be in a range of about 20 wt % to about 80 wt % based on the total weight of the block copolymer. When the coating layer containing the block copolymer having the first block at an amount within this range is disposed on the surface of the anode active material layer, high-voltage stability and lifespan characteristics of the lithium battery may improve.

A charge voltage of the lithium battery may be in a range of about 4.0 volts (V) to about 5.5 V when measured versus lithium (vs. Li). For example, a charge voltage of the lithium battery may be in a range of about 4.2 V to about 5.0 V vs. Li. For example, a charge voltage of the lithium battery may be in a range of about 4.4 V to about 5.0 V vs. Li. For example, a charge voltage of the lithium battery may be in a range of about 4.5 V to about 5.0 V vs. Li. Since a charge voltage of the lithium battery may be charged/discharged at a high voltage of about 4.0 V vs. Li, an energy density of the lithium battery may improve.

Figure 14:
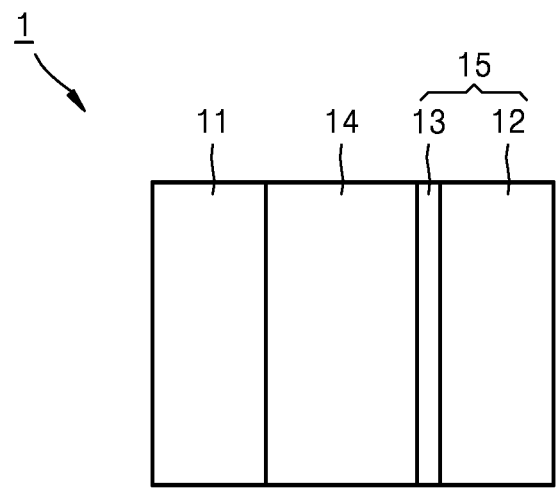
FIG. 14 is a schematic view of a lithium battery according to an embodiment.

For example, as shown in FIG. 14, a lithium battery 1 may include an anode 11; a cathode active material layer 12; and a cathode 15 that includes a coating layer 13 disposed on a cathode active material layer 12. An electrolyte layer 14 may be disposed between the anode 11 and the coating layer 13. The electrolyte layer 14 may include an electrolyte or a separator which has a composition different from that of the coating layer 13. In FIG. 14, a thickness of the coating layer 13 is shown for the purpose of distinction from the cathode active material layer 12, but the actual thickness may be significantly less than what is shown in FIG. 14.

In the lithium battery 1, when the coating layer 13 is disposed on at least a part of the cathode active material layer 12, a surface of the cathode active material layer 12 close to the electrolyte layer 14 may be electrochemically and/or mechanically stabilized. Thus, side reactions on the surface of the cathode active material layer 12 during charging/discharging of the lithium battery 1 may be suppressed, the stability of an interface between the cathode active material layer 12 and the electrolyte layer 14 may improve, and a uniform current distribution on a surface of the cathode 15 may be obtained. As a result, cycle characteristics of the lithium battery 1 may improve. The coating layer 13 may serve as a protective layer that protects a surface of the cathode active material layer 12 from contacting the electrolyte layer 14. In an exemplary embodiment, the coating layer 13 completely covers the surface of the cathode active material layer 12 and the surface of the cathode active material layer 12 minimizes and/or prevents direct contact between the electrolyte layer 14 and the cathode active material layer 12. As a result, the cathode 15 may be protected, which may improve the stability of the cathode 15. Although not shown in the drawing, another coating layer may be disposed on a surface of the anode 11 and thus may further improve stability of the lithium battery 1. A thickness and a composition of the coating layer dispose on the anode 11 may be the same as or different from those of the coating layer 13.

According to an exemplary embodiment, a lithium battery including a cathode having a coating layer disposed on a cathode active material layer may be prepared as follows.

Anode Preparation

As the anode, a lithium metal thin layer may be used without modification. Alternatively, the anode may include a current collector and an anode active material layer disposed on the current collector. For example, the anode may include a lithium metal thin layer that is disposed on a conductive substrate, which is the current collector. The lithium metal thin layer may be integrated with the current collector.

In the anode, the current collector may include a stainless steel, copper, nickel, iron, cobalt, or a combination thereof, but it is not limited thereto, and any metallic substrate that has suitable electrical conductivity may be used. Examples of the current collector may include a conductive oxide substrate and a conductive polymer substrate. The current collector may have various structures, for example, a structure having one surface of an insulating substrate coated with a conductive material, a conductive metal oxide, or a conductive polymer, or a structure where the whole substrate formed of a conductive material. The current collector may be a flexible, non-rigid substrate. Thus, the current collector may be bent. Also, after bending, restoration to its original shape of the current collector may be easy.

According to an exemplary embodiment, the anode may further include an anode active material other than a lithium metal. The anode may be an alloy of a lithium metal and another anode active material, a complex of a lithium metal and another anode active material, or a combination, e.g., a mixture of a lithium metal and another anode active material.

The other anode active material that may be included in the anode may be, for example, a lithium alloyable metal, a transition metal oxide, a non-transition metal oxide, a carbonaceous material, or a combination thereof.

Examples of the lithium alloyable metal may include Si, Sn, Al, Ge, Pb, Bi, Sb, a Si—Y' alloy (where, Y' is an alkaline metal, an alkaline earth metal, a group 13 element, a group 14 element, a transition metal, a rare earth element, or a combined element thereof, and is not Si), or a Sn—Y" alloy (where, Y" is an alkaline metal, an alkaline earth metal, a group 13 element, a group 14 element, a transition metal, a rare earth element, or a combined element thereof, and is not Sn). Examples of the element Y' and/or Y" may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide may include a lithium titanium oxide, a vanadium oxide, or a lithium vanadium oxide.

Examples of the non-transition metal oxide may include $SnO_2$ or $SiO_x$ (where, $0<x<2$).

The carbonaceous material may be crystalline carbon, amorphous carbon, or a combination thereof. The crystalline carbon may be a graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

Alternatively, the anode may include other conventional anode active materials instead of the lithium metal. The anode may be prepared with an anode active material composition including a conventional anode active material, a conducting material, a binder, and a solvent that are generally used in the art, instead of the lithium metal.

For example, after preparing the conventional anode active material composition, a current collector may be directly coated with the anode active material composition to form an anode plate, or the anode active material composition may be cast on a separate support to form an anode active material film, which is then separated from the support and laminated on a current collector to prepare an anode plate. The anode is not limited to a type described above, and any suitable type of anode available in the art may be used. For example, the anode may be prepared by printing an anode active material ink including a general anode active material or a general electrolyte on a current collector by using an additional inkjet method.

The conventional anode active material may be a powder. The powder form of the anode active material may be used in an anode active material composition or an anode active material ink.

Examples of the conducting material may include carbon black or graphite particulates, but they are not limited thereto, and any suitable conducting material, including those available in the art, may be used.

Examples of the binder may include a vinylidene fluoride/hexafluoropropylene copolymer, a polyvinylidene fluoride (PVDF), a polyacrylonitrile, a polymethylmethacrylate, a polytetrafluoroethylene, mixtures thereof, or a styrene butadiene rubber polymer, but they are not limited thereto, and any suitable binder, including those available in the art, may be used.

Examples of the solvent may include N-methyl-pyrrolidone (NMP), acetone, and water, but they are not limited thereto, and any suitable solvent, including those available in the art, may be used.

The amounts of the general anode active material, the conducting material, the binder, and the solvent are those levels that are generally used in the manufacture of a lithium battery. Depending on the use or structure of the lithium battery, one or more of the conducting material, the binder, and the solvent may be omitted.

Cathode Preparation

A cathode may be prepared in the same manner as in preparation of the anode active material composition, except that a coating layer is introduced on a surface of a cathode active material layer, and a cathode active material is used instead of the anode active material.

In the cathode active material composition, a conducting material, a binder, and a solvent may be the same as those defined in connection with the anode active material composition. The cathode active material composition may be prepared by mixing the cathode active material, the conducting material, the binder, and the solvent. An aluminum current collector may be directly coated with the cathode active material composition and dried to prepare a cathode plate on which a cathode active material layer is formed. In an exemplary embodiment, the cathode active material composition may be cast on a separate support, and then a film separated from the support may be laminated on the aluminum current collector to prepare a cathode plate on which a cathode active material layer is formed.

The coating layer having a block copolymer on a surface of a cathode active material layer may be prepared by dipping the cathode plate in a coating solution including the block copolymer and a lithium salt, and drying the resultant dipped cathode plate. The dipping and drying process may be repeated several times to several tens of times. The coating solution may further include a cross-linking monomer, oligomer, or combination thereof. When the coating solution further includes a cross-linking monomer, oligomer, or combination, the coating layer may be heat treated or UV-light treated to additionally introduce a polymer network in the coating layer and/or the cathode active material layer. The order and the number of repetition of a process for introducing the coating layer and a process for introducing a polymer network into the cathode may be appropriately changed and controlled according to the desired physical properties of the cathode.

The cathode active material may be any suitable material, including one available in the art, for example, a lithium metal oxide. In some embodiments, the cathode active material may be at least one of a composite oxide of lithium with a metal selected from among Co, Mn, Ni, and a combination thereof. In some embodiments, the cathode active material may be a compound represented by one of the following formulae: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$, (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In some embodiments, the cathode active material may be $Li[Li_aNi_{1-x-y-a}Co_xMn_y]O_2$ (where $0 < a \leq 0.2$, $0 \leq x \leq 0.5$, and $0 \leq y \leq 0.5$), $LiCoO_2$, $LiMn_xO_{2x}$ (where x=1, 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), or $LiFePO_4$.

The compound having a coating layer on a surface thereof or a mixture of the compound without a coating layer and the compound having a coating layer may be used. In some embodiments, the coating layer may include at least one compound of a coating element selected from an oxide, a hydroxide, an oxyhydroxide, an oxycarbonate, and a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the cathode active material when a compound of the coating element is used. For example, the coating layer may be formed using a spray coating method, or a dipping method. The coating methods may be well understood by one of ordinary skill in the art, and thus a detailed description thereof will be omitted.

The amounts of the cathode active material, the conducting agent, the binder, and the solvent may be in ranges that are used in lithium batteries.

A separator to be disposed between the cathode and the anode may be prepared. The separator may be omitted.

The separator for the lithium battery may be any suitable separator, including those available in the art that are used in lithium batteries. In some embodiments, the separator may have a low resistance to migration of ions in an electrolyte and have an excellent electrolyte-retaining ability. Examples of the separator are glass fiber, polyester, polyethylene, polypropylene, polytetrafluoroethylene (PTFE, also known as TEFLON), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator with a good organic electrolytic solution-retaining ability may be manufactured in the following manner.

In some embodiments, a polymer, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer used to manufacture the separator may be any suitable material, including those that are used as a binder for electrode plates. Examples of the polymer resin are a vinylidenefluoride/hexafluoropropylene copolymer, a polyvinylidene fluoride (PVDF), a polyacrylonitrile, a polymethylmethacrylate, or a combination thereof.

An electrolyte disposed between the cathode and the anode may be prepared.

In some embodiments, the electrolyte disposed between the cathode and the anode may be a liquid electrolyte, a solid electrolyte, a gel electrolyte, or a combination thereof.

A liquid electrolyte may be prepared.

For example, an organic electrolyte solution is prepared. In some embodiments, the organic electrolyte solution may be prepared by dissolving a lithium salt in an ionic liquid and/or an organic solvent.

The ionic liquid may be any suitable material available as an ionic liquid. Examples of the ionic liquid may include Pyr13FSI (N-propyl, N-methyl pyrrolidinium, bis(fluorosulfonyl)imide), Pyr14FSI (N-butyl, N-methyl pyrrolidinium, bis(fluorosulfonyl)imide), Pyr13TFSI (N-propyl, N-methyl pyrrolidinium, bis(trifluoromethanesulfonyl)imide), Pyr14TFSI (N-butyl, N-methyl pyrrolidinium, bis(trifluoromethanesulfonyl)imide), Pyr13TBETI (N-propyl, N-methyl pyrrolidinium, bis(pentafluoroethanesulfonyl)imide), Pyr14BETI (N-butyl, N-methyl pyrrolidinium, bis(pentafluoroethanesulfonyl)imide), Pyr13IM14 (N-propyl, N-methyl pyrrolidinium, bis(nonafluorobutyl-sulfonyl)imide), Pyr14IM14 (N-butyl, N-methyl pyrrolidinium, bis(nonafluorobutyl-sulfonyl)imide), or a combination thereof.

The organic solvent may be any suitable solvent available as an organic solvent. In some embodiments, the organic solvent may be propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, or a combination thereof.

In some embodiments, the lithium salt may be any suitable material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a combination thereof.

Alternatively, a solid electrolyte may be prepared.

A solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphate ester polymer, poly L-lysine, polyester sulfide, polyvinyl alcohol, polyvinylidene fluoride, and a polymer containing an ionic dissociation group.

Examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (where $0.1 \leq x \leq 0.9$), $Li_{1+x}Hf_{2-x}Al_x(PO_4)_3$ (where $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-silicates, $Li_{0.3}La_{0.5}TiO_3$, $Na_5MSi_4O_{12}$ (where M is a rare earth element such as Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (where $x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (where $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (where M is Nb or Ta), $Li_{7+x}A_xLa_{3-x}Zr_2O_{12}$ (where $0 < x < 3$ and A is Zn), or a combination thereof.

A gel electrolyte may be any suitable material available as an electrolyte in the form of gel.

For example, the gel electrolyte may include a polymer and a polymeric ion liquid. The polymer may be a solid graft (block) copolymer electrolyte.

Figure 15:
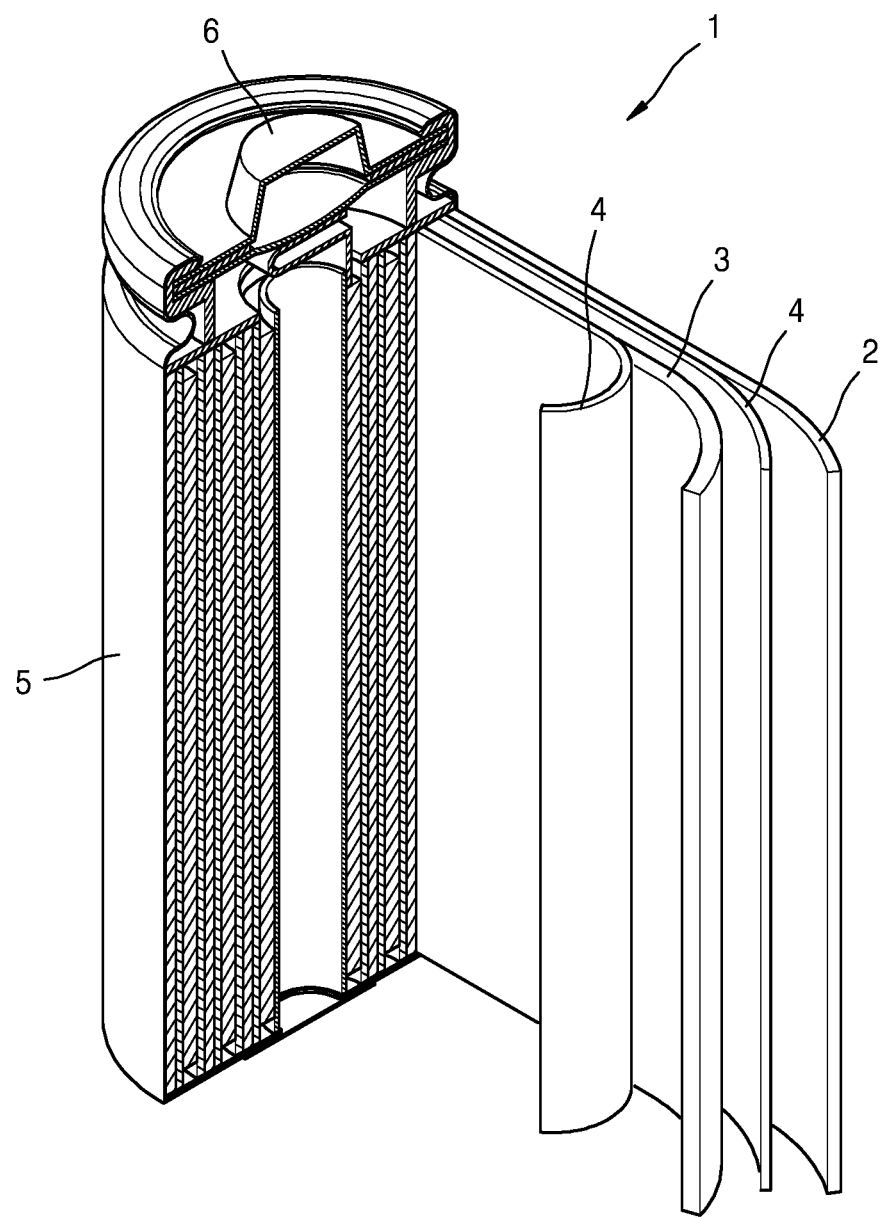
FIG. 15 is a schematic view of a lithium battery according to an embodiment.

According to an exemplary embodiment, a lithium battery is assembled. For example, a lithium battery 1 includes a cathode 3, an anode 2, and a separator 4 that are coated as shown in FIG. 15. The cathode 3, the anode 2, and the separator 4 are wound or folded, and then accommodated in a battery case 5. Subsequently, the battery case 5 may be filled with an organic electrolytic solution and sealed with a cap assembly 6, thereby completing the manufacture of the lithium battery 1. Although not shown in the drawing, an electrolyte layer including a composite electrolyte is formed on a surface of the anode 2 facing the cathode 3. The battery case 5 may be a cylindrical shape, a rectangular shape, or a thin-film type. For example, the lithium battery 1 may be a thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and dipped in the organic electrolytic solution and the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle (EV).

The lithium battery is not limited to a lithium ion battery or a lithium polymer battery and may be a lithium air battery or a lithium all-solid battery. The lithium battery may be a lithium primary battery or a lithium secondary battery.

Hereinafter, embodiments of the present disclosure will be described by referring to Examples and Comparative Examples. However, the following examples are provided for illustrative purposes only, and do not limit the scope of the present disclosure.

EXAMPLES

Preparation of cathode

Preparation Example 1: Preparation of Block Copolymer Layer (SAN)

A polystyrene-b-polyacrylonitrile(PS-b-PAN) block copolymer (182850, CAS No: 9003-54-7, available from Sigma-Aldrich) was added to anhydrous tetrahydrofuran (THF) to obtain 5 wt % of a block copolymer-containing mixture. In the block copolymer, an amount of a polystyrene block was 75 wt %, and an amount of a polyacrylonitrile block was 25 wt %. A weight average molecular weight of the block copolymer was about 165,000 Daltons.

Lithium bis(fluorosulfonyl) imide (LiFSI, $LiN(SO_2F)_2$) was added to the block copolymer-containing mixture to obtain a composition for forming a layer. Here, an amount of LiFSI was about 30 parts by weight based on 100 parts by weight of the block copolymer.

The composition for forming a layer was cast on a substrate, and THF from the cast resultant was slowly evaporated in an argon glove box for 24 hours at 25° C. and dried in vacuum at 40° C. for 24 hours to prepare a block copolymer layer. A thickness of the layer was about 80 μm.

Preparation Example 2: Preparation of Block Copolymer Layer (Xlinked SEOS)

A polystyrene-b-poly(ethyleneoxide)-b-polystyrene(PS-b-PEO-b-PS) block copolymer (12-59-12 kg/mol, available from Polymer Source, a number average molecular weight (Mn)=83,000 Daltons) was dissolved in 5 wt % of anhydrous THF to obtain a first solution. An amount of a first polystyrene block in the block copolymer was 14.5 wt %, an amount of a poly(ethyleneoxide) block was in the block copolymer was 71 wt %, and a second polystyrene block in the block copolymer was 14.5 wt %.

During the preparation of the first solution, 20 parts by weight of diethylene glycol diacrylate (DEGDA, a cross-linking oligomer) was added based on 100 parts by weight of the block copolymer.

Also, 1 part by weight of 2-hydroxy-2-methyl-1-phenyl-1-propanone (HMPP, a photoinitiator) was added to the first solution based on 100 parts by weight of DEGDA.

Lithium trifluoromethanesulfonimide (LiTFSI) was added to the first solution to obtain a composition for forming a layer. Here, an amount of LiTFSI was about 30 parts by weight based on 100 parts by weight of the block copolymer.

The composition for forming a layer was cast on a substrate, and THF from the cast resultant was slowly evaporated in an argon glove box for 24 hours at 25° C. and dried under vacuum at 40° C. for 24 hours to prepare a block copolymer layer.

A UV-cured polymer network (PDEGDA) was formed by irradiating the dried layer with UV-light for 3 minutes. The UV-light polymerization was performed by with an irradiation peak intensity of about 350 milliwatts per square centimeter ($mW/cm^2$) by using a Hg UV-Lamp (available from Lichtzen). As a result, a block copolymer layer introduced with a polymer network was prepared. A thickness of the layer introduced with the polymer network was about 80 μm.

Preparation of Cathode

Comparative Example 1: Bare Cathode

A $LiCoO_2$ powder and a carbon conducting material (Super-P, available from Timcal Ltd.) were mixed at a weight ratio of 90:5, and a polyvinylidene fluoride (PVDF) binder solution was added thereto to prepare a cathode active material slurry so that a weight ratio of the cathode active material:carbon conducting agent:binder was 90:5:5.

The slurry thus prepared was coated on an aluminum substrate (having a thickness of 15 μm) by using a doctor-blade, and the resultant was dried at a reduced pressure at 120° C., rolled by using a roll-press to make the resultant in the form of a sheet, thereby preparing a cathode having a cathode active material disposed on a current collector.

Comparative Example 2: DEGDA Coating Cathode

The cathode prepared in Comparative Example 1 was dipped in a solution prepared by dissolving 0.5 wt % of DEGDA (a cross-linking oligomer) including HMPP (a photoinitiator) and 1.3 M $LiPF_6$ for 20 seconds, and the resultant was taken out from the solution and dried. A solvent of the solution was acetone, and an amount of the photoinitiator was 0.1 wt % of the cross-linking oligomer.

A UV-cured polymer network (PDEGDA) was formed by irradiating UV-light to the dried cathode for 3 minutes. The UV-light polymerization was performed by irradiating with UV-light at an irradiation peak intensity of about 350 $mW/cm^2$ using a Hg UV-Lamp (available from Lichtzen). As a result, a cathode having a block copolymer coating layer introduced with a polymer network on a surface of a cathode active material layer was prepared. A thickness of the coating layer introduced with the polymer network was about 50 nm.

Comparative Example 3: PS Coating Cathode

A polystyrene (PS) homopolymer (441147, available from Sigma-Aldrich) was added to anhydrous THF to obtain 0.5 wt % of a homopolymer-containing mixture. A weight average molecular weight of the homopolymer was about 100,000 Daltons.

LiFSI was added to the homopolymer-containing mixture to obtain a composition for coating. Here, an amount of LiFSI was about 30 parts by weight based on 100 parts by weight of the homopolymer.

The cathode prepared in Comparative Example 1 was dipped in the composition for coating for 1 hour, and the composition for forming a coating layer was coated on a surface of the cathode. The coated cathode was dried in the air for 2 hours at room temperature and vacuum-dried for 1 hour at 40° C. to prepare a cathode having a coating layer formed on a surface of a cathode active material layer. A thickness of the coating layer was about 100 nm to about 500 nm.

Example 1: SAN Coating Cathode

A polystyrene-b-polyacrylonitrile(PS-b-PAN) block copolymer(182850, CAS No: 9003-54-7, available from Sigma-Aldrich) was added to anhydrous THF to obtain 0.5 wt % of a block copolymer-containing mixture. In the block copolymer, an amount of a polystyrene block was 75 wt %, and an amount of a polyacrylonitrile block was 25 wt %. A weight average molecular weight of the block copolymer was about 165,000 Daltons.

LiFSI was added to the block copolymer-containing mixture to obtain a composition for forming a layer. Here, an amount of LiFSI was about 30 parts by weight based on 100 parts by weight of the block copolymer.

The cathode prepared in Comparative Example 1 was dipped in the composition for coating for 1 hour, and the composition for forming a coating layer was coated on a surface of the cathode. The coated cathode was dried in the air for 2 hours at room temperature and vacuum-dried for 1 hour at 40° C. to prepare a cathode having a coating layer formed on a surface of a cathode active material layer. A thickness of the coating layer was about 100 nm to about 500 nm.

Example 2: ABS Coating Cathode

A polyacrylonitrile-b-polybutadiene-b-polystyrene(PAN-b-PB-b-PS) block copolymer was added to anhydrous THF to obtain 0.5 wt % of a block copolymer-containing mixture.

In the block copolymer, an amount of a polyacrylonitrile block was 25 wt %, an amount of a polybutadiene block was 35 wt %, and an amount of a polystyrene block was 40 wt %. A weight average molecular weight of the block copolymer was about 150,000 Daltons.

LiFSI was added to the block copolymer-containing mixture to obtain a composition for coating. Here, an amount of LiFSI was about 30 parts by weight based on 100 parts by weight of the block copolymer.

The cathode prepared in Comparative Example 1 was dipped in the composition for coating for 1 hour, and the composition for forming a coating layer was coated on a surface of the cathode. The coated cathode was dried in the air for 2 hours at room temperature and vacuum-dried for 1 hour at 40° C. to prepare a cathode having a coating layer formed on a surface of a cathode active material layer. A thickness of the coating layer was about 100 nm to about 500 nm.

Example 3: SIS Coating Cathode

A polystyrene-b-polyisoprene-b-polystyrene(PS-b-PI-b-PS) block copolymer (P5780, available from Polymer Source) was added to anhydrous THF to obtain 0.5 wt % of a block copolymer-containing mixture. In the block copolymer, an amount of a first polystyrene block was 33 wt % (about 50,000 Daltons), an amount of a polyisoprene block was 33 wt % (about 50,000 Daltons), and an amount of a second polystyrene block was 33 wt % (about 50,000 Daltons). A weight average molecular weight of the block copolymer was about 150,000 Daltons.

LiFSI was added to the block copolymer-containing mixture to obtain a composition for coating. Here, an amount of LiFSI was about 30 parts by weight based on 100 parts by weight of the block copolymer.

The cathode prepared in Comparative Example 1 was dipped in the composition for coating for 1 hour, and the composition for forming a coating layer was coated on a surface of the cathode. The coated cathode was dried in the air for 2 hours at room temperature and vacuum-dried for 1 hour at 40° C. to prepare a cathode having a coating layer formed on a surface of a cathode active material layer. A thickness of the coating layer was about 100 nm to about 500 nm.

Example 4: SAN+DEGDA Coating Cathode

A polystyrene-b-polyacrylonitrile(PS-b-PAN) block copolymer (182850, CAS No: 9003-54-7, available from Sigma-Aldrich) was added to anhydrous THF to obtain 0.5 wt % of a block copolymer-containing mixture. In the block copolymer, an amount of a polystyrene block was 75 wt %, and an amount of a polyacrylonitrile block was 25 wt %. A weight average molecular weight of the block copolymer was about 165,000 Daltons.

During the preparation of block copolymer-containing mixture, 20 parts by weight of DEGDA (a cross-linking oligomer) was added based on 100 parts by weight of the block copolymer.

Also, 1 part by weight of HMPP (a photoinitiator) was added to the first solution based on 100 parts by weight of DEGDA (a cross-linking oligomer).

LiTFSI was added to the first solution to obtain a composition for forming a layer. Here, an amount of LiTFSI was about 30 parts by weight based on 100 parts by weight of the block copolymer.

The cathode prepared in Comparative Example 1 was dipped in the composition for coating for 1 hour, and the composition for forming a layer was coated on a surface of the cathode. The coated cathode was dried in the air for 2 hours at room temperature and vacuum-dried for 1 hour at 40° C. to prepare a dried cathode.

A UV-cured polymer network (PDEGDA) was formed by irradiating the dried cathode with UV-light to the dried cathode for 3 minutes. The UV-light polymerization was performed by irradiating with UV-light at an irradiation peak intensity of about 350 mW/cm$^2$ by using a Hg UV-Lamp (available from Lichtzen). As a result, a cathode having a block copolymer coating layer introduced with a polymer network cross-linked on a surface of a cathode active material layer was prepared. A thickness of the coating layer introduced with the cross-linked polymer network was about 100 nm to about 500 nm.

Example 5: SEOS+DEGDA Coating Cathode

A polystyrene-b-poly(ethyleneoxide)-b-polystyrene(PS-b-PEO-b-PS) block copolymer (12-59-12 kg/mol, available from Polymer Source, a number average molecular weight (Mn)=83,000 Daltons) was dissolved in 0.5 wt % of anhydrous THF to obtain a first solution.

During the preparation of the first solution, 20 parts by weight of DEGDA (a cross-linking oligomer) was added based on 100 parts by weight of the block copolymer.

Also, 1 part by weight of HMPP (a photoinitiator) was added to the first solution based on 100 parts by weight of DEGDA (a cross-linking oligomer).

Lithium trifluoromethanesulfonimide (LiTFSI) was added to the first solution to obtain a composition for forming a layer. Here, an amount of LiTFSI was about 30 parts by weight based on 100 parts by weight of the block copolymer.

The cathode prepared in Comparative Example 1 was dipped in the composition for coating for 1 hour, and the composition for forming a layer was coated on a surface of the cathode. The coated cathode was dried in the air for 2 hours at room temperature and vacuum-dried for 1 hour at 40° C. to prepare a dried cathode.

A UV-cured polymer network (PDEGDA) was formed by irradiating UV-light to the dried cathode for 3 minutes. The UV-light polymerization was performed by irradiating UV-light at an irradiation peak intensity of about 350 mW/cm$^2$ by using a Hg UV-Lamp (available from Lichtzen). As a result, a cathode having a block copolymer coating layer introduced with a polymer network cross-linked on a surface of a cathode active material layer was prepared. A thickness of the coating layer introduced with the cross-linked polymer network was about 100 nm to about 500 nm.

Preparation of Lithium Battery

Example 6: Protected Cathode/Bare Anode

An electrolyte was disposed between the coated cathode prepared in Example 1 and a lithium metal anode (having a thickness of about 20 μm) to prepare a lithium battery (a pouch cell) having a theoretical discharge capacity of 34 mAh.

A polyethylene/polypropylene separator was disposed between the coated cathode and the anode, and a liquid electrolyte was added thereto. As the liquid electrolyte, an electrolyte solution prepared by dissolving 1 moles per liter (M) LiFSI in a solvent mixture including dimethylether (DME) and 1,1,2,2,-tetrafluoroethyl-2,2,3,3-tetrafluoropropylether (TTE) at a volume ratio of 2:8 was used.

Examples 7 to 10: Protected Cathode/Bare Anode

Lithium batteries (pouch cells) were prepared in the same manner as in Example 6, except that the cathodes prepared in Examples 2 to 5 were used instead of the cathode prepared in Example 1, respectively.

Comparative Examples 4 to 6

Lithium batteries (pouch cells) were prepared in the same manner as in Example 6, except that the cathodes prepared in Comparative Examples 1 to 3 were used instead of the cathode prepared in Example 1, respectively.

Example 11: Protected Cathode/Protected Anode

The cathode prepared in Example 1 (SAN coating) was prepared.

Then, a composition for anode coating was prepared.

A polystyrene-b-polyisoprene-b-polystyrene(PS-b-PI-b-PS) block copolymer (P5780, available from Polymer Source) was added to anhydrous THF to obtain 5 wt % of a block copolymer-containing mixture. In the block copolymer, an amount of a first polystyrene block was 33 wt % (about 50,000 Daltons), an amount of a polyisoprene block was 33 wt % (about 50,000 Daltons), and an amount of a second polystyrene block was 33 wt % (about 50,000 Daltons). A weight average molecular weight of the block copolymer was about 150,000 Daltons.

200 parts by weight of alumina ($Al_2O_3$) based on 100 parts by weight of the block copolymer was added to the block copolymer-containing mixture.

Also, LiFSI was added to the block copolymer-containing mixture to obtain a composition for coating. Here, an amount of LiFSI was about 30 parts by weight based on 100 parts by weight of the block copolymer.

The composition for coating was coated on a lithium metal thin film (having a thickness of about 20 μm) by using a doctor-blade, and the resultant was dried in the air for 2 hours at room temperature and vacuum-dried for 1 hour at 40° C. to prepare a dried anode. A thickness of the coating layer formed on the dried anode was about 2 μm to about 3 μm.

A polyethylene/polypropylene separator was disposed between the cathode and the anode, and a liquid electrolyte was added thereto. As the liquid electrolyte, an electrolyte solution prepared by dissolving 1 M LiFSI in a solvent mixture including DME and TTE at a volume ratio of 2:8 was used to prepare a pouch cell having a theoretical discharge capacity of 34 mAh.

Evaluation Example 1: Tensile Modulus and Elongation

A tensile modulus of the block copolymer layer prepared in Preparation Example 1 was measured by using DMA800 (available from TA Instruments), and a sample of the block copolymer layer was prepared according to ASTM standard D412 (Type V specimens). The tensile modulus is also referred to as Young's modulus.

The strain change of the layer with respect to a stress was measured at a temperature of 25° C., at a relative humidity of about 30%, and at a rate of 5 mm per minute, and the result is shown in FIG. 1. From a slope of the stress-strain curve in FIG. 1, a tensile modulus 190 MPa was obtained, and elongation at break 158.1% was obtained from the strain value.

The layer prepared in Preparation Example 1 exhibited a high strength as the tensile module was about 190 MPa. Also, the electrolyte prepared in Preparation Example 1 showed excellent ductility as the elongation at break was 150% or higher.

Evaluation Example 2: Electrolyte Stability Evaluation

The block copolymer layers prepared in Preparation Examples 1 and 2 were dipped in a 50 ml beaker containing an electrolyte solution prepared by dissolving 1 M LiFSI in a solvent mixture including DEM and TTE at a volume ratio of 20:80, and the change occurring therein was observed for 48 hours.

After 48 hours, the block copolymer layers prepared in Preparation Examples 1 and 2 maintained the initial shapes thereof, no swelling was observed, and the block copolymer layers did not dissolve in the electrolyte solution.

Therefore, it was confirmed that the block copolymer layers were stable with respect to an electrolyte solution including an ether solvent.

A solubility parameter (δ) of DME was 21.7 $(MPa)^{1/2}$.

A solubility parameter (δ) of PS included in SAN, which was used in Preparation Example 1, was 18.6 to 19.3 $(MPa)^{1/2}$, a solubility parameter (δ) of PAN was 26.1 $(MPa)^{1/2}$, and a solubility parameter (δ) of THF was 18.6 $(MPa)^{1/2}$. Meanwhile, a solubility parameter (δ) of PEO was 20.5 $(MPa)^{1/2}$.

Evaluation Example 3: Impedance Measurement

The resistance of each of the membrane electrode assemblies was measured by a 2-probe method using an impedance analyzer (Solartron 1260A Impedance/Gain-Phase Analyzer) with respect to the lithium batteries prepared in Examples 6 to 8 and Comparative Examples 4 and 5. An amplitude was ±10 mV, and a frequency range was from 0.1 Hz to 1 MHz.

Nyquist plots of the results of impedances measured when an elapsed time after preparing the lithium batteries prepared in Examples 6 to 8 and Comparative Examples 4 and 5 was 24 hours are shown in FIGS. 2 to 5. The interfacial resistances of the electrodes in FIGS. 2 to 5 are determined by locations and sizes of the semicircles. The difference between the left x-intercept and the right x-intercept represents the interfacial resistance of the electrode.

Figure 2:
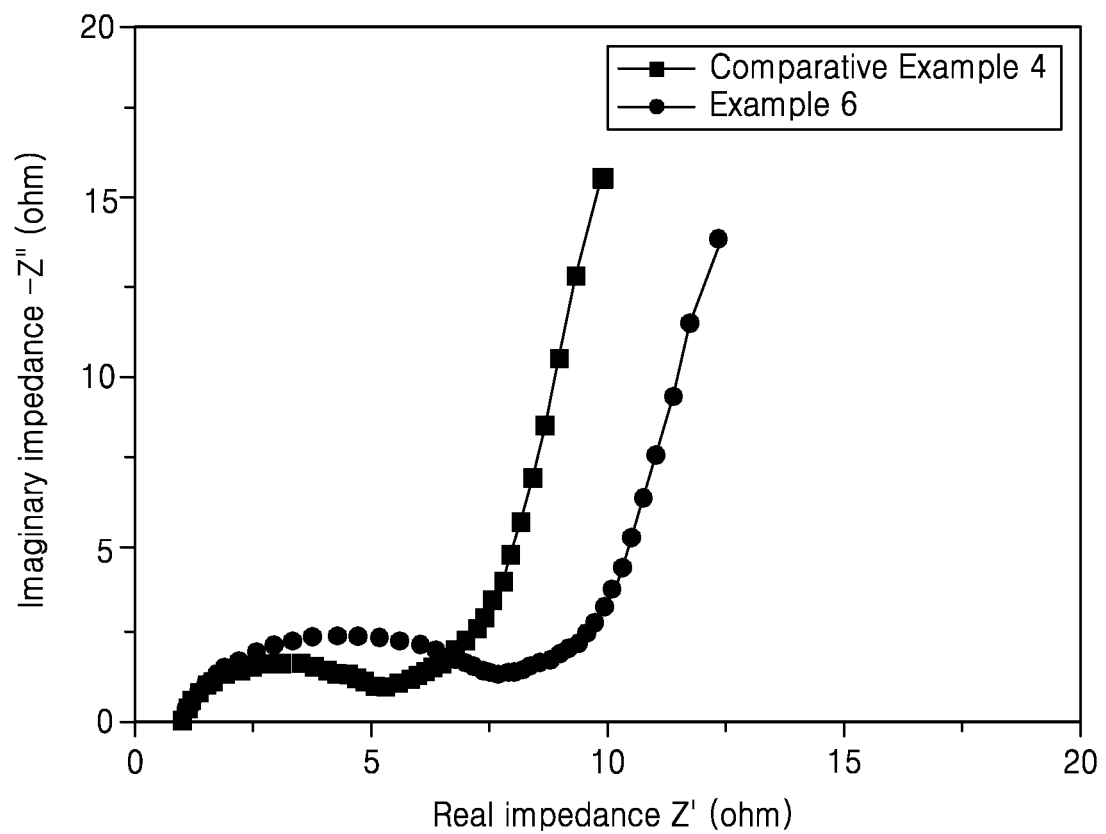
FIG. 2 is a graph of imaginary impedance (−Z", ohm) versus real impedance (Z', ohm) and illustrates a Nyquist Plot that shows the impedance measurement results of lithium batteries of Example 6 and Comparative Example 4.

As shown in FIG. 2, an interfacial resistance of the lithium battery of Example 6 increased about 50% or more than that of the lithium battery of Comparative Example 4.

Figure 3:
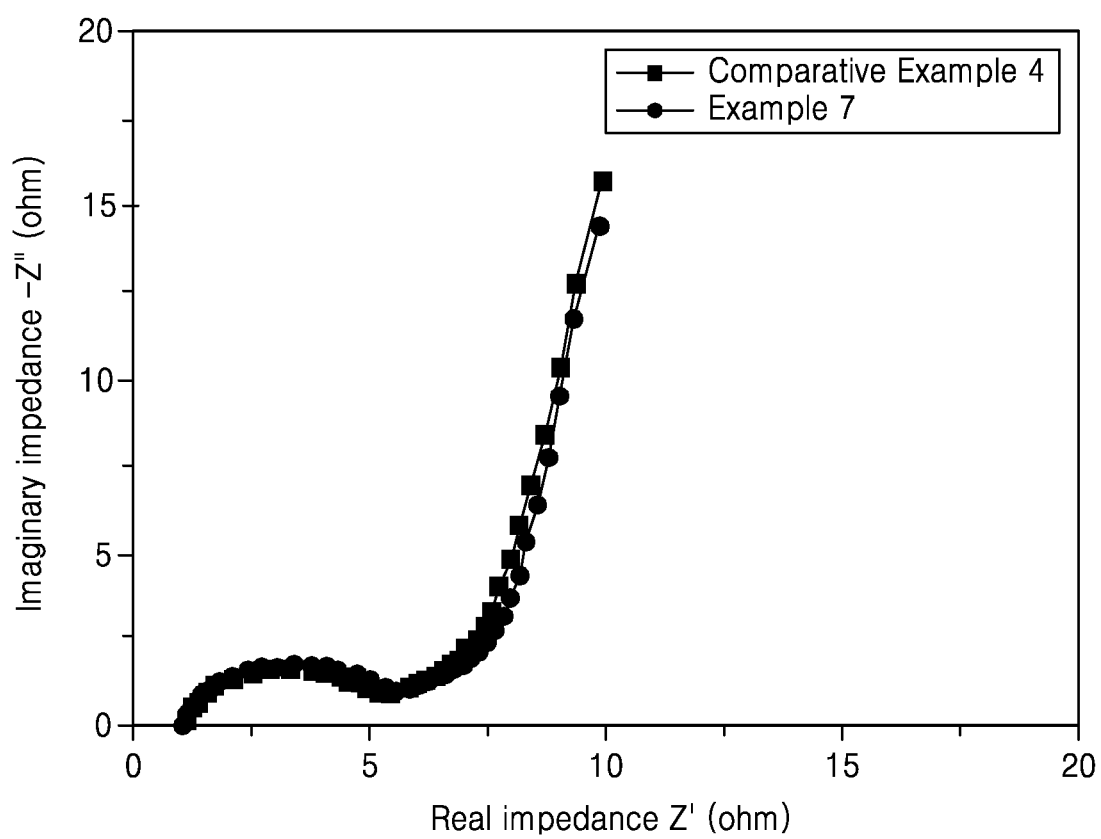
FIG. 3 is a graph of imaginary impedance (−Z", ohm) versus real impedance (Z', ohm) and illustrates a Nyquist Plot that shows the impedance measurement results of lithium batteries of Example 7 and Comparative Example 4.
Figure 5:
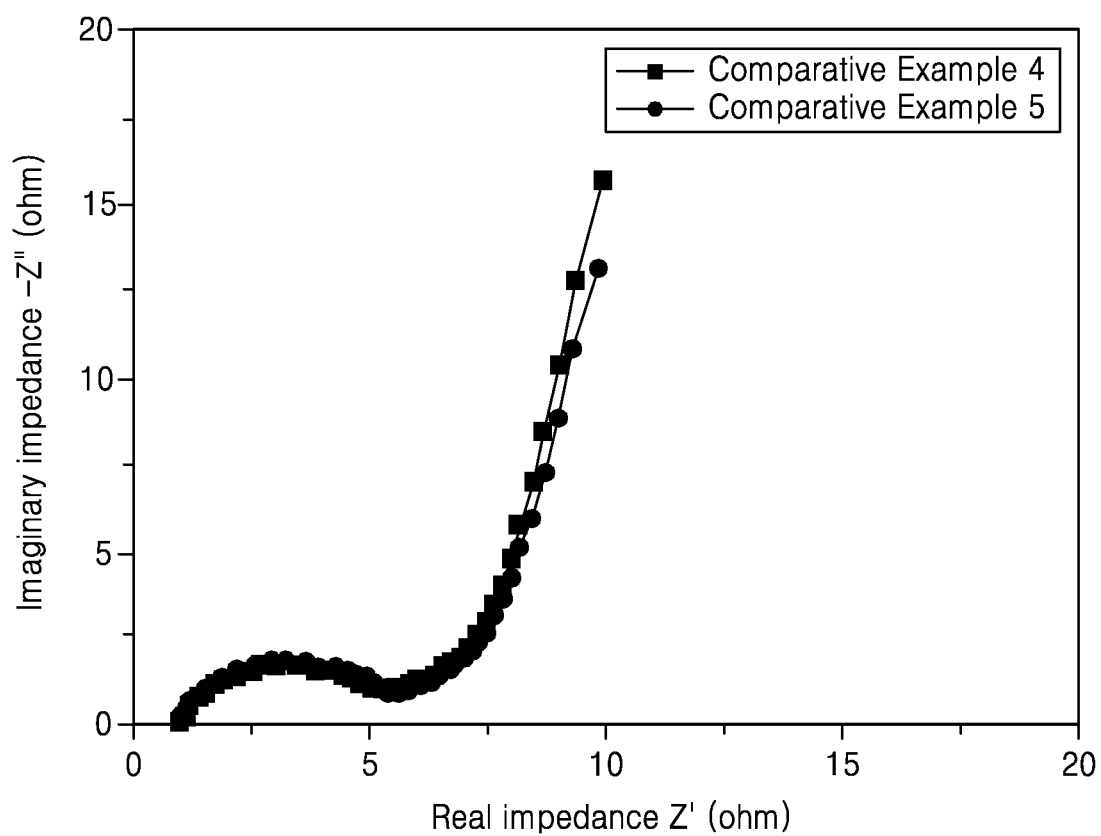
FIG. 5 is a graph of imaginary impedance (−Z", ohm) versus real impedance (Z', ohm) and illustrates a Nyquist Plot that shows the impedance measurement results of lithium batteries of Comparative Example 5 and Comparative Example 5.

As shown in FIGS. 3 and 5, interfacial resistances of the lithium batteries of Example 7 and Comparative Example 5 were similar to that of the lithium battery of Comparative Example 3.

Figure 4:
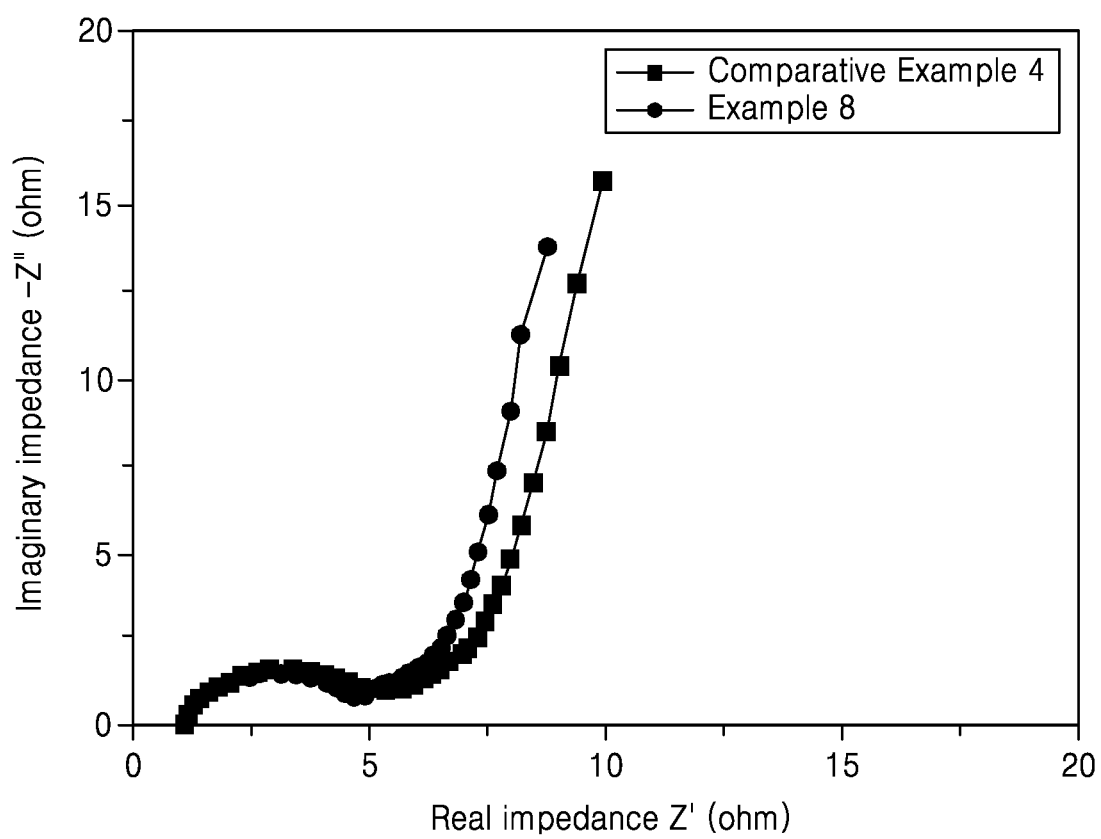
FIG. 4 is a graph of imaginary impedance (−Z", ohm) versus real impedance (Z', ohm) and illustrates a Nyquist Plot that shows the impedance measurement results of lithium batteries of Example 8 and Comparative Example 4.

As shown in FIG. 4, an interfacial resistance of the lithium battery of Example 8 slightly decreased than that of the lithium battery of Comparative Example 4.

Evaluation Example 3: Charging/Discharging Test

At 25° C., the lithium batteries prepared in Examples 6 to 10 and Comparative Examples 4 to 6 were charged with a constant current of 0.7 C rate until a voltage was 4.5 V (vs. Li) and were cut-off at a current of 0.05 C rate while the voltage was maintained at 4.50 V at a constant voltage mode. Subsequently, the batteries were discharged with a constant current of 0.5 C rate until a voltage was 3.0 V (vs. Li) as a discharging process (a first cycle of a formation process). The charging/discharging process was performed twice more to complete the formation process.

At 25° C., the lithium secondary batteries after the formation process were charged with a constant current of 0.7 C rate until a voltage was 4.5 V (vs. Li) and were cut-off at a current of 0.05 C rate while the voltage was maintained at 4.50 V at a constant voltage mode. Subsequently, the batteries were discharged with a constant current of 0.5 C rate until a voltage was 3.0 V (vs. Li) as a discharging process.

The charging/discharging process was repeated 29 to 44 times more so that the total number of the charging/discharging cycles was 30 to 45. Depending on the lithium batteries, when the discharge capacity dramatically decreased, the charging/discharging process was ceased within 30 to 45 cycles.

The charging/discharging test results are shown in FIGS. 6 to 12.

Figure 6:
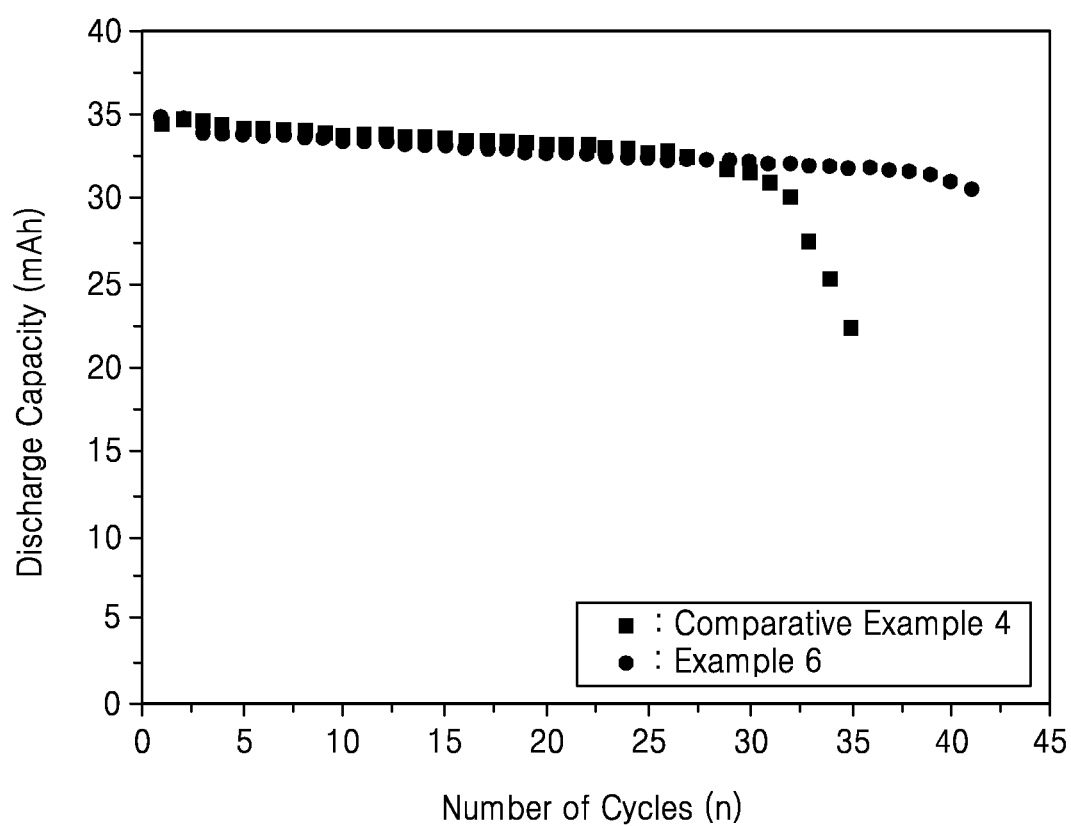
FIG. 6 is a graph of discharge capacity (milliampere hours, mAh) versus number of cycles (n) and shows the lifespan characteristic measurement results of the lithium batteries of Example 6 and Comparative Example 4.
Figure 8:
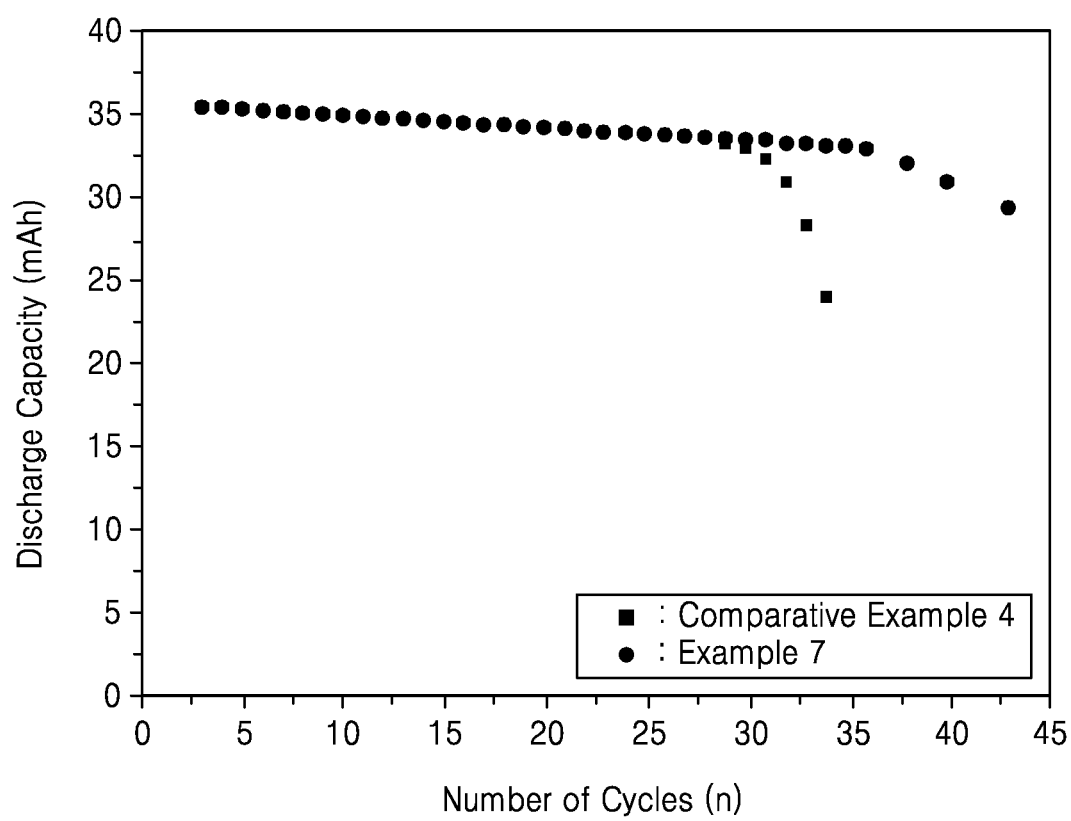
FIG. 8 is a graph of discharge capacity (mAh) versus number of cycles (n) and shows the lifespan characteristic measurement results of the lithium batteries of Example 7 and Comparative Example 4.
Figure 9:
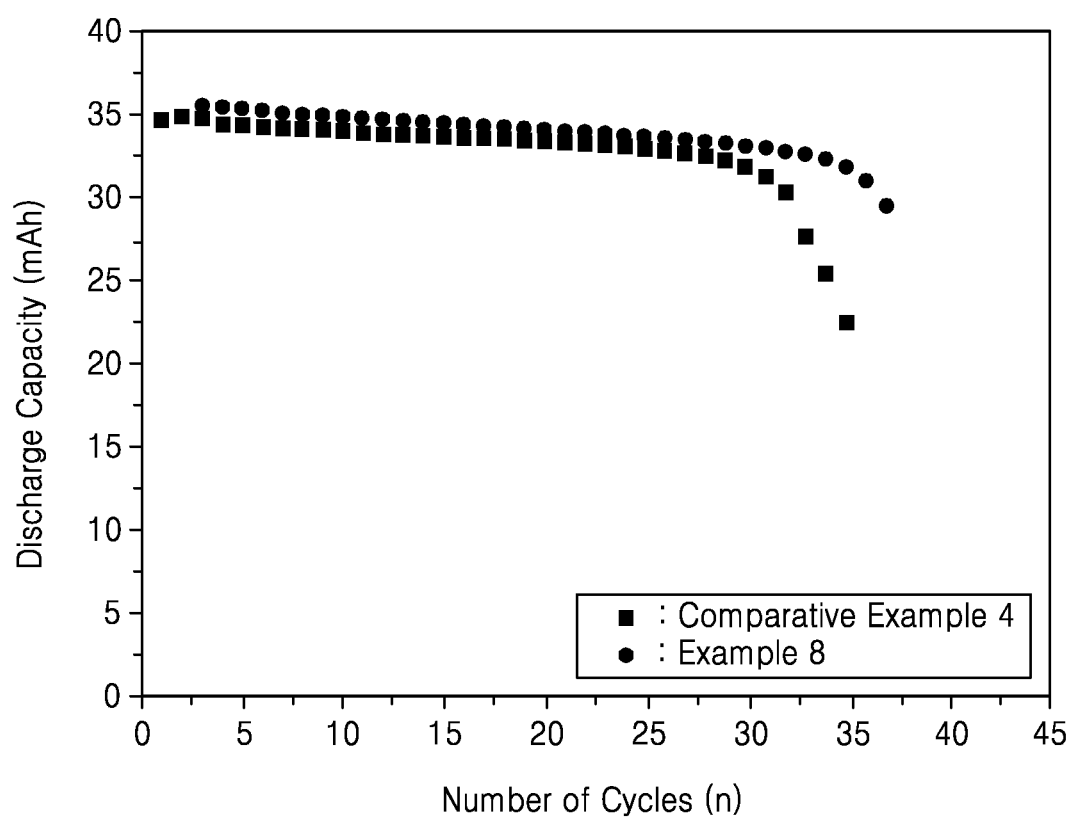
FIG. 9 is a graph of discharge capacity (mAh) versus number of cycles (n) and shows the lifespan characteristic measurement results of the lithium batteries of Example 8 and Comparative Example 4.

As shown in FIGS. 6, 8, and 9, lifespan characteristics of the lithium batteries of Examples 6, 7, and 8, which used a cathode coated with a block copolymer, was improved compared to those of the lithium battery of Comparative Example 4, which used a bare cathode.

Figure 7:
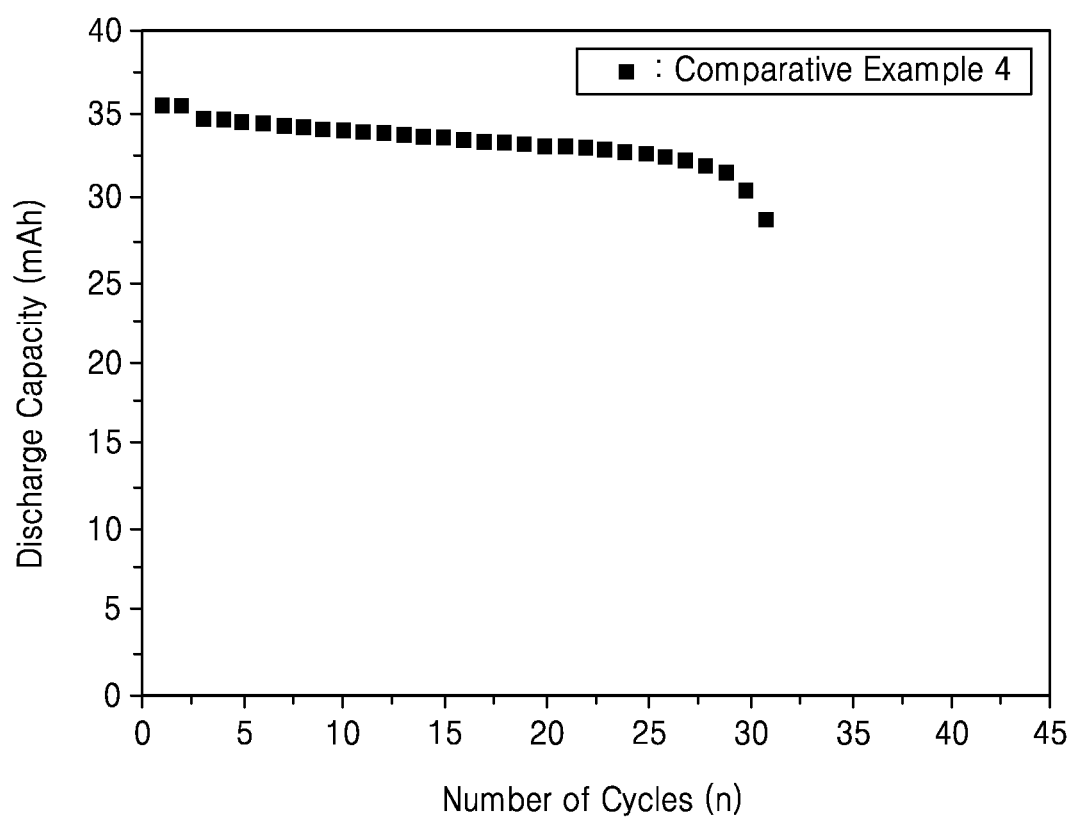
FIG. 7 is a graph of discharge capacity (mAh) versus number of cycles (n) and shows the lifespan characteristic measurement results of the lithium battery of Comparative Example 6.

As shown in FIG. 7, lifespan characteristics of the lithium battery of Comparative Example 6, which used a cathode coated with a PS homopolymer, was deteriorated compared to those of the lithium battery of Comparative Example 4, which used a bare cathode.

Figure 10:
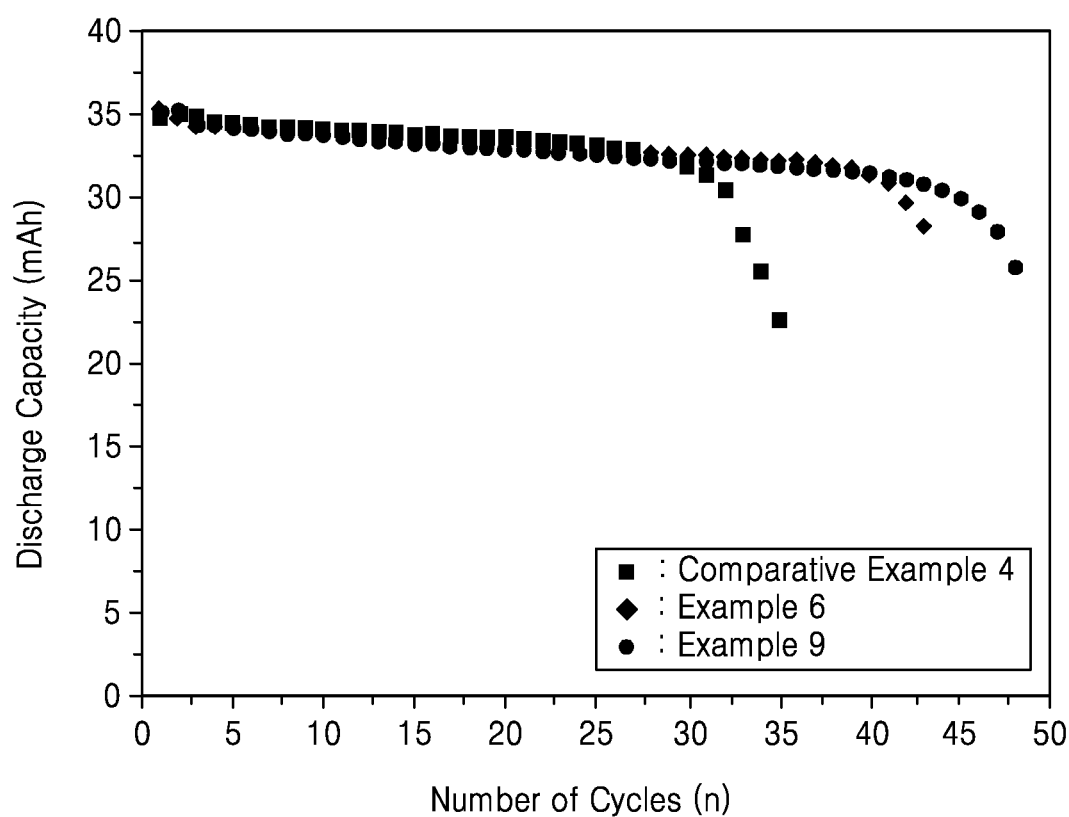
FIG. 10 is a graph of discharge capacity (mAh) versus number of cycles (n) and shows the lifespan characteristic measurement results of the lithium batteries of Example 6, Example 9, and Comparative Example 4.

As shown in FIG. 10, lifespan characteristics of the lithium battery of Example 6, which used a cathode coated with a block copolymer, was improved compared to those of the lithium battery of Comparative Example 4, which used a bare cathode. Further, lifespan characteristics of the lithium battery of Example 9, which used a cathode coated with a block copolymer introduced with a cross-linked polymer network, was further improved compared to those of the lithium battery of Comparative Example 4, which used a bare cathode.

Figure 11:
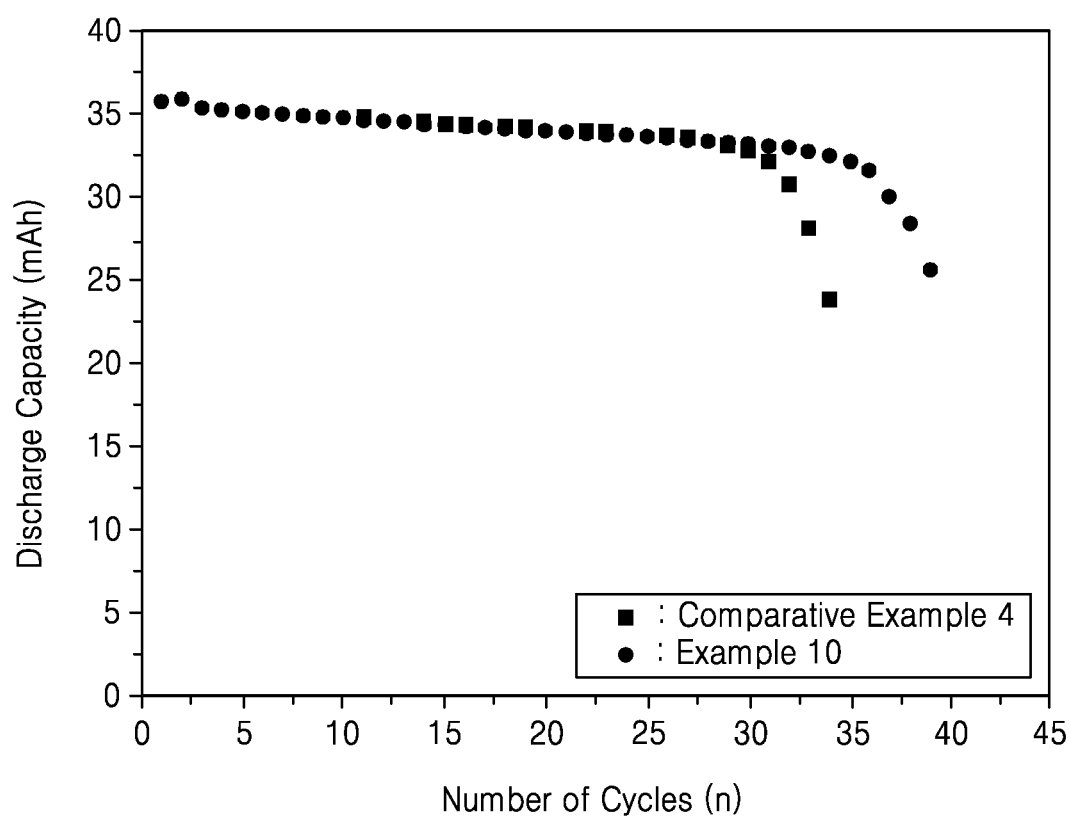
FIG. 11 is a graph of discharge capacity (mAh) versus number of cycles (n) and that shows the lifespan characteristic measurement results of the lithium batteries of Example 10 and Comparative Example 4.

As shown in FIG. 11, lifespan characteristics of the lithium battery of Example 10, which used a cathode coated with a block copolymer introduced with a cross-linked polymer network, further improved compared to those of the lithium battery of Example 4, which used a bare cathode.

Figure 12:
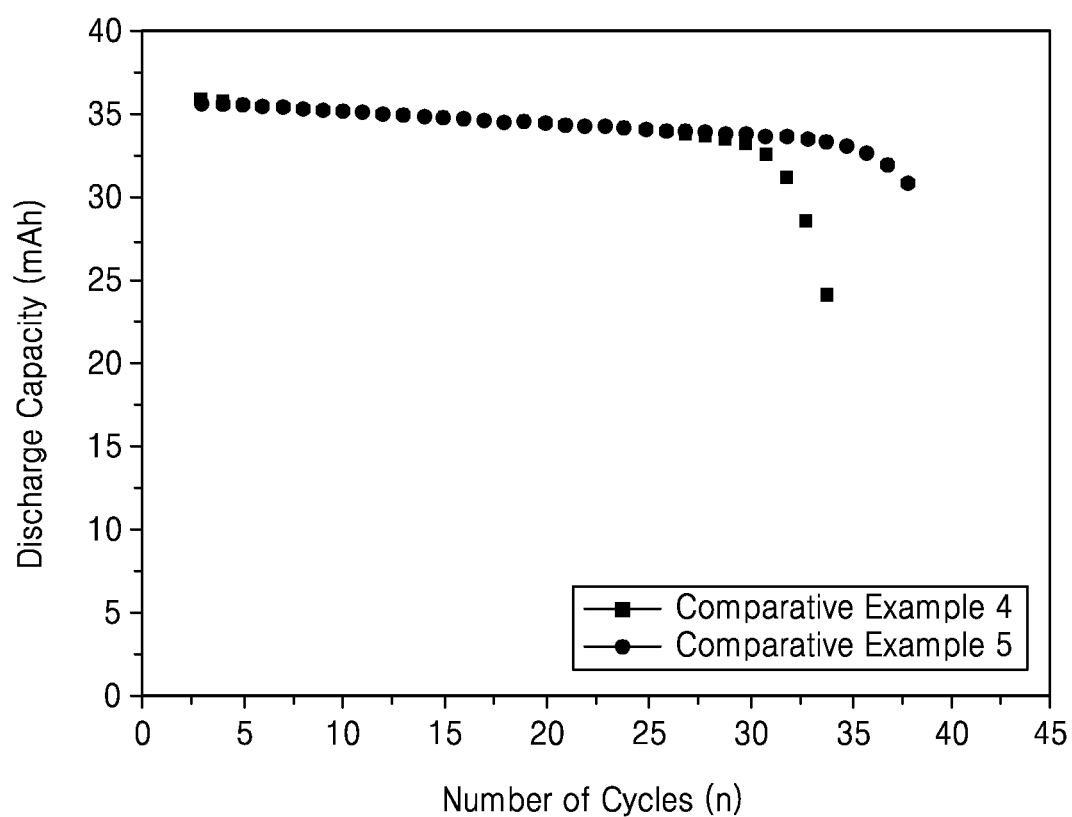
FIG. 12 is a graph of discharge capacity (mAh) versus number of cycles (n) and that shows the lifespan characteristic measurement results of the lithium batteries of Comparative Example 4 and Comparative Example 5.

As shown in FIG. 12, lifespan characteristics of the lithium battery of Comparative Example 4, which used a cathode coated with a cross-linked polymer network, was improved compared to those of the lithium battery of Comparative Example 5, which used a bare cathode.

Evaluation Example 4: Charging/Discharging Test

At 25° C., the lithium batteries prepared in Examples 6 and 11 and Comparative Example 4 were charged with a constant current of 0.7 C rate until a voltage was 4.4 V (vs. Li), and were cut-off at a current of 0.05 C rate while the voltage was maintained at 4.4 V at a constant voltage mode. Subsequently, the batteries were discharged with a constant current of 0.5 C rate until a voltage was 3.0 V (vs. Li) as a discharging process (a first cycle of a formation process). The charging/discharging process was performed twice more to complete the formation process.

At 25° C., the lithium secondary batteries after the formation process were charged with a constant current of 0.7 C rate until a voltage was 4.4 V (vs. Li) and were cut-off at a current of 0.05 C rate while the voltage was maintained at 4.4 V at a constant voltage mode. Subsequently, the batteries were discharged with a constant current of 0.5 C rate until a voltage was 3.0 V (vs. Li) as a discharging process.

The charging/discharging process was repeated 99 times more so that the total number of the charging/discharging cycles was 100.

A capacity retention rate may be calculated according to Equation 1.

A capacity retention rate (%)=[a discharge capacity at $100^{th}$ cycle/a discharge capacity at $1^{st}$ cycle]× 100　　　Equation 1

TABLE 1

| | 100th cycle capacity retention rate [%] |
|---|---|
| Comparative Example 4 | 64.7 |
| Example 6 | 70.6 |
| Example 11 | 72.8 |

Figure 13:
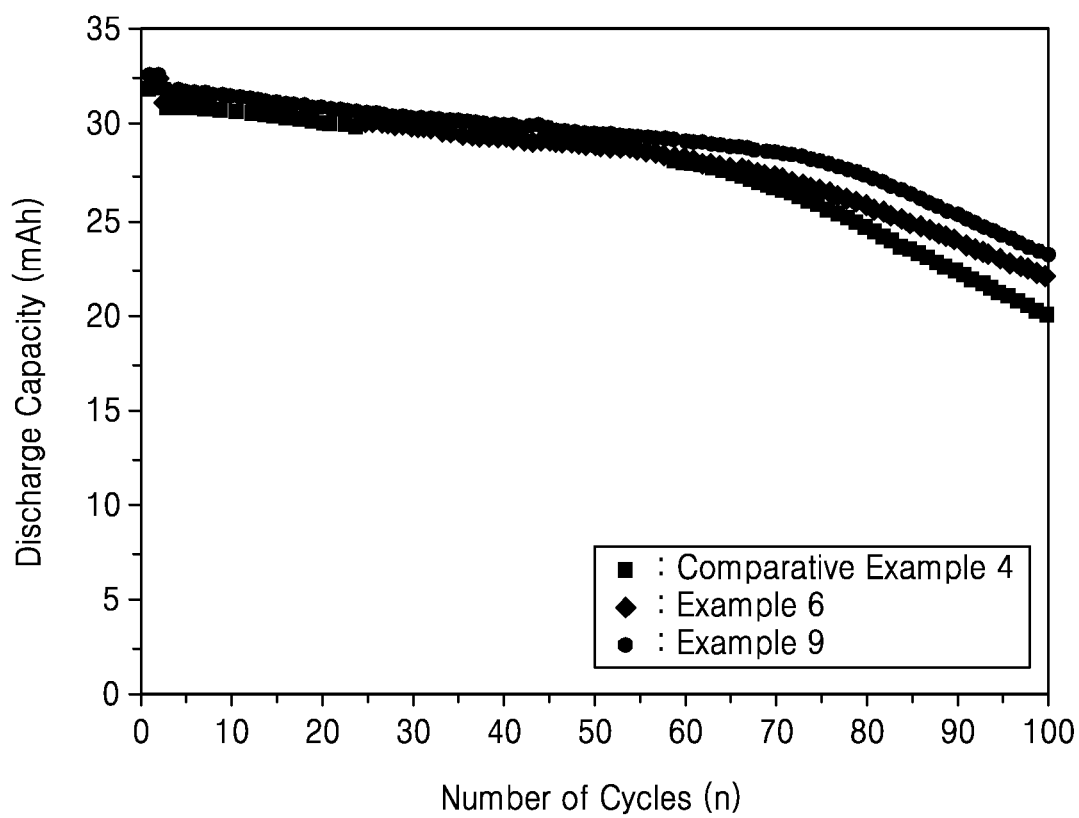
FIG. 13 is a graph of discharge capacity (mAh) versus number of cycles (n) and that shows the lifespan characteristic measurement results of the lithium batteries of Example 6, Example 11, and Comparative Example 4.

As shown in Table 1 and FIG. 13, lifespan characteristics of the lithium battery of Example 6, which used a cathode coated with a block copolymer, was improved, and lifespan characteristics of the lithium battery of Example 11, which uses a cathode and an anode both coated with a block copolymer, was further improved, compared to those of the lithium battery of Comparative Example 4, which used a bare cathode.

As described above, according to one or more embodiments, when a coating layer is introduced to a surface of a cathode active material layer, lifespan characteristics of a lithium battery may improve at a high voltage.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A cathode comprising:
   a cathode active material layer comprising a cathode active material; and
   a non-porous coating layer disposed on and completely covering the cathode active material layer and comprising a block copolymer,
   wherein the block copolymer comprises at least one first block that constitutes a structure domain and at least one second block that constitutes an ion conductive domain, and
   wherein a total amount of the at least one first block is in a range of about 20 weight percent to about 80 weight percent based on a total weight of the block copolymer.

2. The cathode of claim 1, wherein a tensile modulus of the coating layer is about $1 \times 10^6$ Pascals or greater when measured at 25° C.

3. The cathode of claim 1, wherein an elongation at break of the coating layer is about 100% or greater when measured at 25° C.

4. The cathode of claim 1, wherein a thickness of the coating layer is about 1 micrometer or less.

5. The cathode of claim 1, wherein a solubility parameter difference between the block copolymer and an ether solvent, a carbonate solvent, or a combination thereof, is about 3 or greater.

6. The cathode of claim 1, wherein a molecular weight of each of the at least one first block and the at least one second block is about 5,000 Dalton or greater.

7. The cathode of claim 1, wherein the at least one first block comprises a polystyrene, a hydrogenated polystyrene, a poly(C1 to C8 alkyl)methacrylate, a poly(methyl methacrylate), a polyvinylpyridine, a polyvinylcyclohexane, a polyimide, a polyamide, a polyethylene, a polybutylene, a polypropylene, a poly(4-methylpentene-1), a poly(butylene terephthalate), a poly(isobutyl methacrylate), a poly(ethylene terephthalate), a polyvinylcyclohexane, a polymaleic acid, a polymaleic anhydride, a polyamide, a poly(tert-butylvinylether), a poly(cyclohexylmethacrylate), a poly (cyclohexyl vinyl ether), a poly(tert-butyl vinyl ether), a polyvinylidene fluoride, a poly(divinylbenzene), a copolymer comprising at least two repeating units selected therefrom, or a combination thereof.

8. The cathode of claim 1, wherein the at least one second block comprises a polyacrylonitrile, a polyisoprene, a polybutadiene, a polychloroprene, a polyisobutylene, a polyurethane, a polyethylene oxide, a polydimethyl siloxane, or a combination thereof.

9. The cathode of claim 1, wherein the block copolymer further comprises a polymer network.

10. The cathode of claim 9, wherein the at least one second block of the block copolymer penetrates into the polymer network.

11. The cathode of claim 10, wherein the at least one second block comprises a polysiloxane, a polyacrylonitrile, a polyisoprene, a polybutadiene, a polychloroprene, a polyisobutylene, a polyurethane, a polyethylene oxide, a polydimethyl siloxane, or a combination thereof.

12. The cathode of claim 9, wherein the polymer network comprises a polymerization product of a cross-linking monomer, oligomer, or a combination thereof.

13. The cathode of claim 12, wherein the cross-linking monomer or oligomer comprises diethylene glycol diacrylate, triethylene glycol diacrylate, a polyethylene glycol diacrylate, an ethoxylated trimethylolpropane triacrylate, hexanediol diacrylate, octafluoropentyl acrylate, or a combination thereof.

14. The cathode of claim 1, wherein the cathode active material layer further comprises a polymerization product of a cross-linking monomer, oligomer, or a combination thereof, wherein the polymerization product is disposed on both a surface of the cathode active material layer and inside the cathode active material layer.

15. The cathode of claim 1, wherein the block copolymer comprises a block copolymer comprising a polystyrene first block and a polyacrylonitrile second block; a block copolymer comprising a polymethylmethacrylate first block and a polyacrylonitrile second block; a block copolymer comprising a polystyrene first block, a polyacrylonitrile second block, and a polybutadiene second block; a block copolymer comprising a polystyrene first block, a polyisoprene second block, and a polystyrene first block; a block copolymer comprising a polystyrene first block and a polybutadiene second block; a block copolymer comprising a polystyrene first block, a polybutadiene second block, and a polystyrene first block; a block copolymer comprising a polystyrene first block, a polyethylene oxide second block, a polybutadiene second block, a polystyrene first block, and a polymer network; a block copolymer comprising a polystyrene first block, a polyethylene oxide second block, and a polymer network; a block copolymer comprising a polystyrene first block, a polyethylene oxide second block, a polystyrene first block, and a polymer network; a block copolymer comprising a polystyrene first block, a polysiloxane second block, and a polymer network; a block copolymer comprising a polystyrene first block, a polysiloxane second block, a polystyrene first block, and a polymer network; or a combination thereof.

16. The cathode of claim 1, wherein the coating layer further comprises LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$F)$_2$, LiN(SO$_2$C$_2$F$_5$)$_2$, LiN(SO$_2$CF$_3$)$_2$, LiN $(SO_2CF_2CF_3)_2$, $LiSbF_6$, $LiPF_3(CF_2CF_3)_3$, $LiPF_3(C_2F_5)_3$, $LiPF_3(CF_3)_3$, $LiB(C_2O_4)_2$, or a combination thereof.

17. The cathode of claim 1, wherein an amount of the cathode active material is at least about 90 parts by weight based on 100 parts by weight of the cathode active material layer.

18. The protected cathode of claim 1, wherein the coating layer completely covers the surface of the cathode active material layer such that contact between the cathode active material layer and an electrolyte is completely blocked.

19. A lithium battery comprising
the cathode of claim 1;
an anode; and
an electrolyte disposed between the cathode and the anode.

20. The lithium battery of claim 19, wherein a charging voltage versus lithium metal is in a range of about 4.0 V to about 5.5 V.

\* \* \* \* \*